United States Patent [19]

Mayer

[11] Patent Number: 5,319,762
[45] Date of Patent: Jun. 7, 1994

[54] ASSOCIATIVE MEMORY CAPABLE OF MATCHING A VARIABLE INDICATOR IN ONE STRING OF CHARACTERS WITH A PORTION OF ANOTHER STRING

[75] Inventor: Rollin P. Mayer, Fullerton, Calif.

[73] Assignee: The Mitre Corporation, Bedford, Mass.

[21] Appl. No.: 578,932

[22] Filed: Sep. 7, 1990

[51] Int. Cl.[5] .................. G06F 15/40; G06F 7/04; G11C 15/00
[52] U.S. Cl. .................. 395/425; 395/600; 365/49; 364/DIG. 2
[58] Field of Search ............. 395/425, 600, 800; 365/49; 364/200 MS File, 900 MS File

[56] References Cited

U.S. PATENT DOCUMENTS

| | | | |
|---|---|---|---|
| 4,118,788 | 10/1978 | Roberts | 395/600 |
| 4,296,475 | 10/1981 | Nederlof et al. | 395/425 |
| 4,575,818 | 3/1986 | Almy et al. | 365/49 |
| 4,598,385 | 7/1986 | Kessels et al. | 395/600 |
| 4,852,059 | 7/1989 | Oates | 365/49 |
| 4,958,377 | 9/1990 | Takahashi | 365/49 |
| 5,122,984 | 6/1992 | Strehler | 365/49 |
| 5,175,860 | 12/1992 | Yamada | 395/800 |

OTHER PUBLICATIONS

Barr et al, The Handbook of Artificial Intelligence, vol. II, Chpt. VI.C4: "Programming Languages for AI Research" and Pattern Matching, 1982, pp. 58–64.
Chisvin et al., Content-Addressable and Associative Memory: Alternatives to the Ubiquitous RAM, Computer Jul. 1989, pp. 51–64.
Caxton C. Foster, Determination of Priority in Associative Memories, IEEE Transactions on Computers, Aug. 1968, pp. 788–789.
Michael J. Foster, E. T.: A Laser-Programmed Language Recognizer Chip, 1984 Conf. on Adv. Research in VLSI, M.I.T., Jan., 1984, pp. 171–178.
Alfred C. Hartmann, Software or Silicon? The Designer's Option, Proceedings of the IEEE, vol. 74, No. 6, Jun., 1986, pp. 861–873.
DeWitt Landis, Multiple-Response Resolution in Associative Systems, IEEE Transactions on Computers, vol. C-26, No. 3 Mar., 1977, pp. 230–235.
Richard G. Naedel, "Intelligent Associative Memory (IAM) An Overview," pp. 61–68, Information Science, DS200lt, 1989.
S.Y.W. Su et al., The Architectural Features and Implementation Techniques of the Multicell CASSM, IEEE Transactions on Computers, vol. C-28, No. 6, Jun., 1979, pp. 430–445.
K. I. Yu et al., Pipelined for speed: The Fast Data Finder system TRW Electronic and Defense Sector, Quest, winter 1986, pp. 5–19.
TRW Group Defense Systems, Fast Data Finder 1000 & 2000, 1988, pp. 1–2.

Primary Examiner—Glenn Gossage
Attorney, Agent, or Firm—Fish & Richardson

[57] ABSTRACT

An associative memory that finds the location of at least one string of characters in the associative memory that matches a string of characters presented sequentially as an input to the associative memory. The string of characters in the associative memory, the input string of characters, or both may include a specially marked characters, or set of characters, that acts as a "variable indicator." The specially marked character, or set of characters, will "match" a portion of the other string. A flag is set in the associative memory at either the starting locations or the ending locations of the matching strings. Flags are provided only at locations of stored matching strings of characters found within a selected addressable area or areas. Each flag can be moved from a first byte to a second byte in the associative memory that has a predetermined location relative to the first byte. A selection circuit selects one of the matching stored strings of characters by enabling a test signal which selects one of the flags to propagate through the associative memory circuit in a daisy-chain manner. The daisy-chain path is segmented in order to decrease the propagation time of the test signal. A summation circuit, useful in neural network applications, adds a number presented as at least one input byte to the associative memory to a number stored as at least one byte in the associative memory at the location of a stored string of characters that matches the input string.

44 Claims, 14 Drawing Sheets

ASSOCIATIVE MEMORY CAPABLE OF MATCHING A VARIABLE INDICATOR IN ONE STRING OF CHARACTERS WITH A PORTION OF ANOTHER STRING

BACKGROUND OF THE INVENTION

This invention relates to associative memories that find the location of a string of characters in a memory that matches a string of characters presented as an input.

Artificial intelligence (AI) systems often require the retrieval of an item of information from an unknown location in memory. Associative memory circuits are known that find the location of a string of characters in a memory that matches a string of characters presented as an input. These circuits typically compare stored computer bytes (each byte representing a character) with input bytes, one input byte at a time. The comparison process typically involves passing a "match" signal from memory byte to memory byte as consecutive bytes in memory match consecutive bytes of a string of characters presented as an input. See, for example, Almy et al., U.S. Pat. No. 4,575,818, "Apparatus for In Effect Extending the Width of an Associative Memory by Serial Matching of Portions of the Search Pattern," Mar. 11, 1986.

Such known circuits are of limited help in most artificial intelligence systems because the item of information sought to be retrieved is typically a syntax that includes variables, rather than a specific identifier. For example, an artificial intelligence system for translating computer programming commands from one format to another may require the retrieval of a stored "dictionary" entry in which a sentence with variables is translated into one or more other sentences with the same variables. A typical such dictionary entry might be "'Do !v1 after ⇌v2'means 'Do !v2. Do !v1.'" (!v1 and !v2 indicate variables.) The dictionary entry tells the artificial intelligence system to translate, for example, "Do run after compile," to "Do compile. Do run."

SUMMARY OF THE INVENTION

In one aspect, the invention features an associative memory that finds the location of at least one string of characters in the associative memory that matches a string of characters presented sequentially as an input to the associative memory. The string of characters in the associative memory, the input string of characters, or both may include a specially marked character, or set of characters, that acts as a "variable indicator." The specially marked character, or set of characters, that will "match" a portion of the other string. In preferred embodiments, the string of characters may include any number of such variable indicators, located at any place within the string. Each variable can indicate whether it may match with fewer than a specified number of characters, with more than a specified number of characters, or with more than one specified number but less than another specified number In another aspect of the invention, a numerical variable control circuit matches at least a portion of the stored string of characters with a number presented as a string of input bytes if the portion of the stored string of characters represents a number that bears a predetermined mathematical relationship to the number presented as the string of input bytes. For example, the numerical variable control circuit may match a portion of the stored string with the input number if the portion of the stored string represents a number that is higher than the input number.

In another aspect of the invention, a summation circuit adds a number presented as at least one input byte to the associative memory circuit to a number stored as at least one byte in the associative memory at the location of a stored string of characters that matches the input string. The summation circuit is useful in neural network processing applications.

In another aspect of the invention, a flag is set in the associative memory at the starting locations of the matching strings (rather than the ending location of the matching strings as taught by U.S. Pat. No. 4,575,818). In another aspect, each flag can be moved from a first byte in the associative memory to a second byte in the associative memory that has a predetermined location relative to the first byte. In another aspect of the invention, one or more addressable areas of the associative memory may be selected, and flags are provided in the associative memory only at locations of stored matching strings of characters found within the addressable area or areas.

In another aspect, a selection circuit selects one of the matching stored strings of characters by enabling a test signal, which selects one of the flags, to propagate in a daisy-chain manner through a plurality of first-level chains of gates. Each gate in each first-level chain receives as inputs the propagating test signal and an output from a flag circuit. Other test signals also propagate in a daisy-chain manner through at least one higher-level chain of gates. Each gate in each higher-level chain receives as inputs the propagating test signal and a single output of a lower-level chain of gates that indicates whether a flag is present in any of the flag circuits in the lower-level chain. The first flag encountered by the test signals at all hierarchical levels is the selected flag.

In another aspect of the invention, an address readout circuit reads out the address of the stored string of matching characters. The address readout circuit includes a row address encoder that receives a signal from each row of bytes indicating whether the flag is present in the row and encodes the signals into a row address, and a column address encoder that receives a signal from each column of bytes indicating whether the flag is present in the column and encodes the signals into a column address.

In another aspect of the invention, a selection circuit selects one of a plurality of flags and produces a selected flag signal at the location in the memory of the selected flag. A flag clearing circuit receives a clear selected flag signal, and gates the clear selected flag signal with the selected flag signal at the location in the memory of the selected flag, to produce a signal for clearing the selected flag. The selection circuit can then select another flag.

DESCRIPTION OF THE PREFERRED EMBODIMENT

We first briefly describe the drawings.

Drawings

Figure 11:
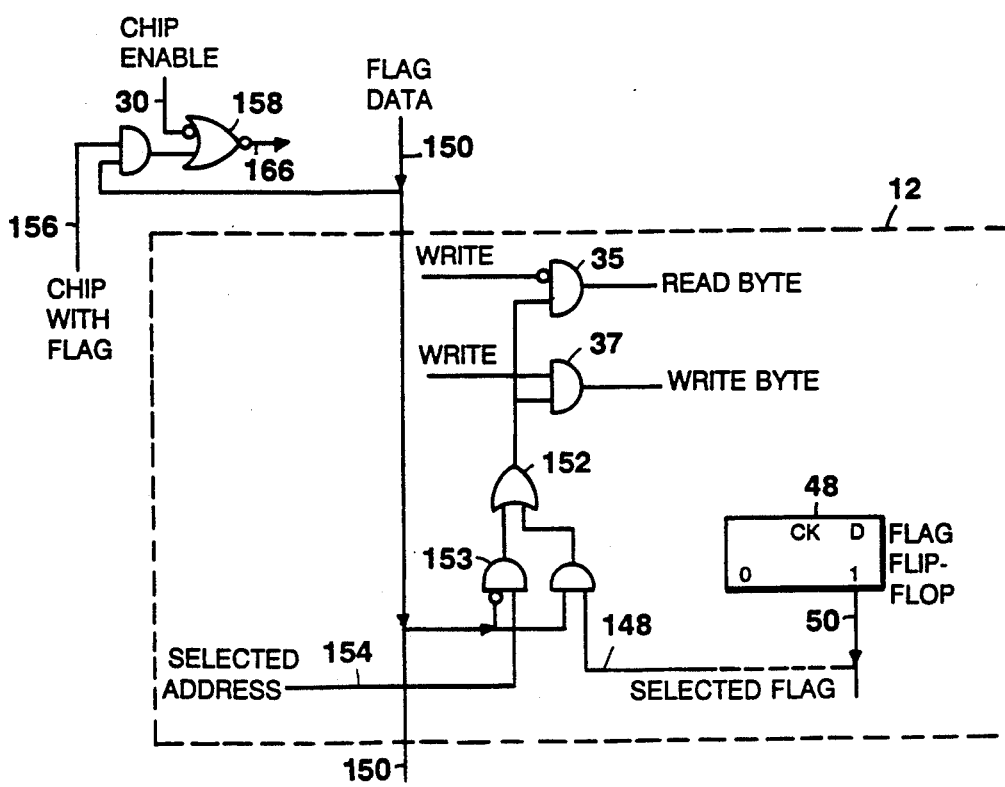
FIG. 11 is a circuit diagram illustrating a reading and writing circuit according to the invention, through which data is read from or written into a flagged byte contained in a string in memory that matches an input string of characters.
Figure 11A:
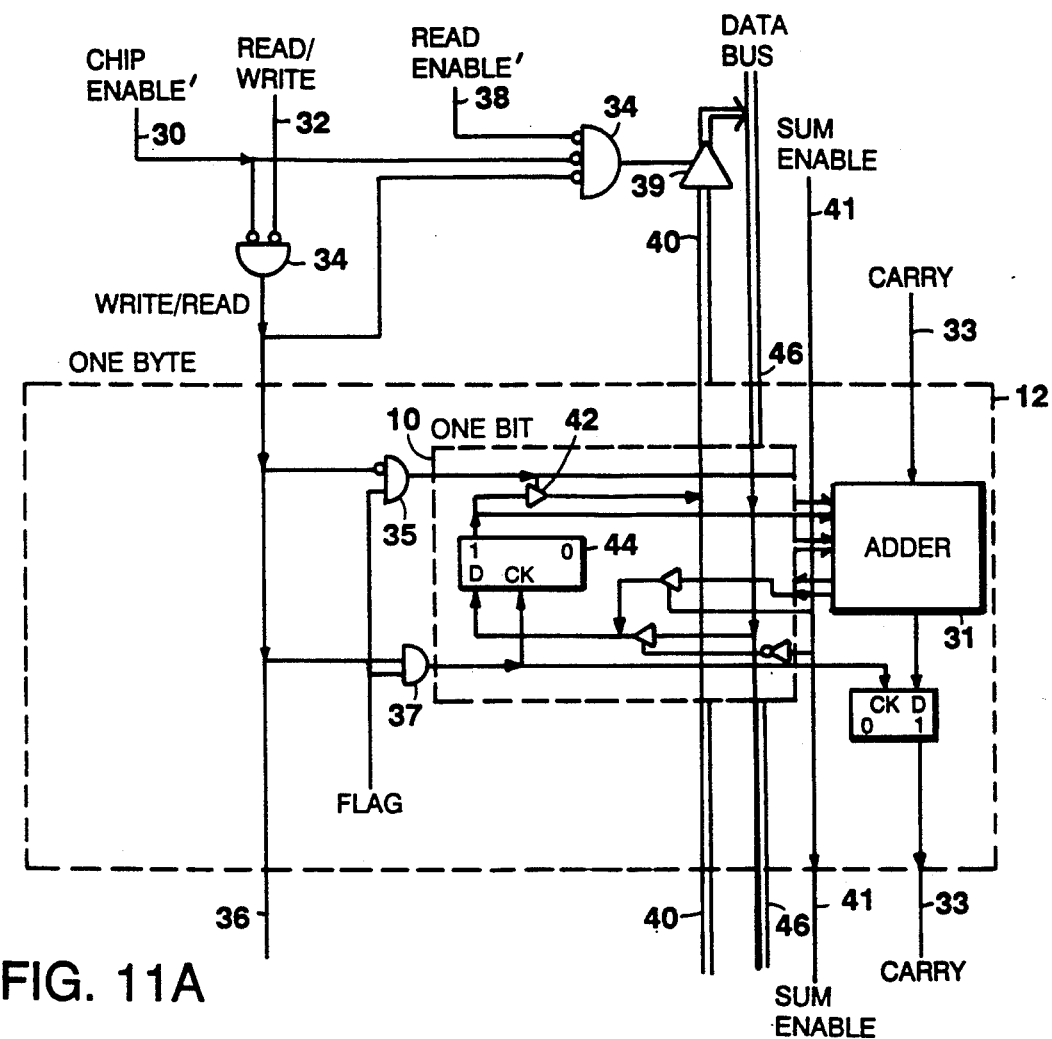

FIG. 11A a circuit diagram illustrating a sum writing circuit according to the invention, through which a store byte is added to an input byte and the sum is written into the stored byte.

Figure 12:
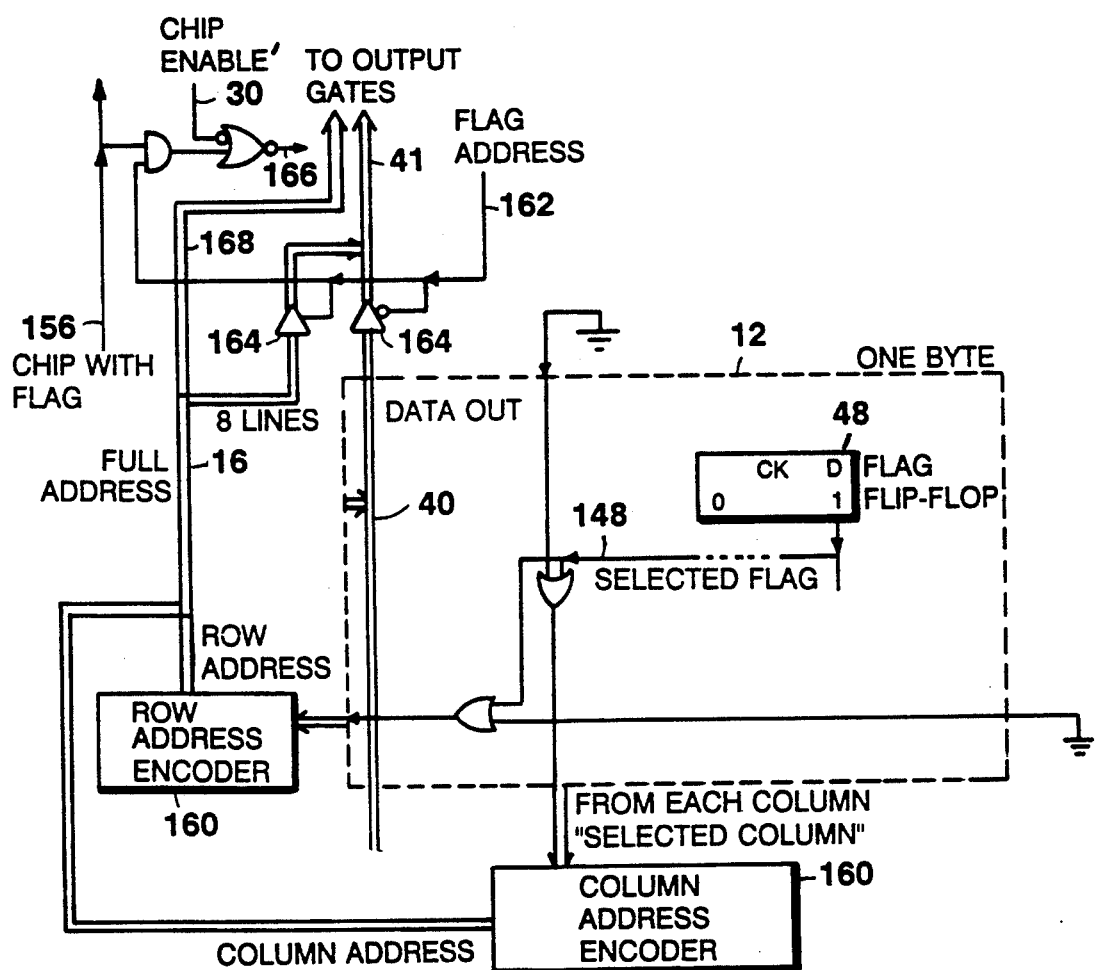

FIG. 12 is a circuit diagram illustrating a address-reading circuit according to the invention, through which the circuit reads the address of a flagged byte contained in a string in memory that matches an input string of characters.

Figure 13:
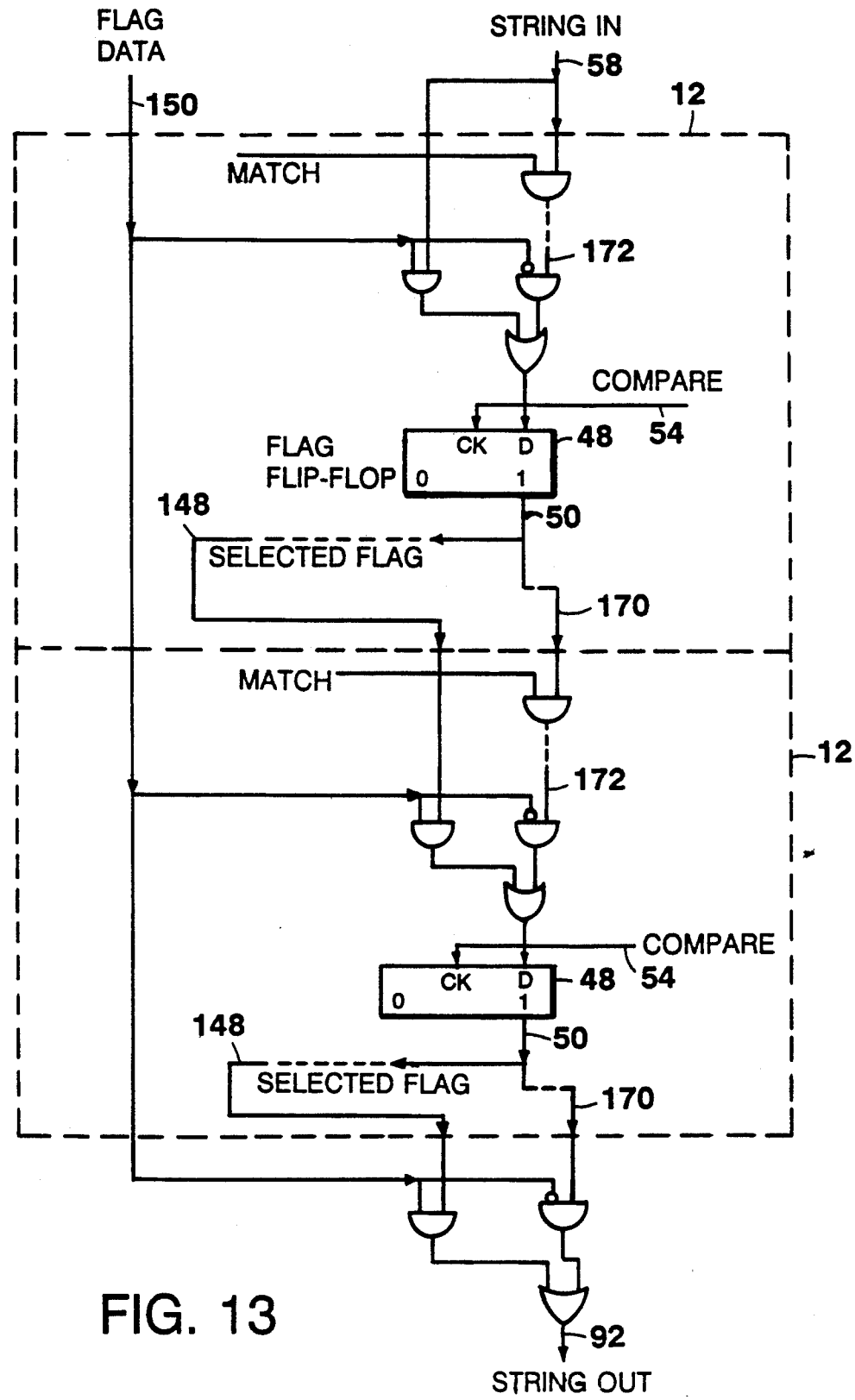

FIG. 13 is a circuit diagram illustrating a flag indexing circuit according to the invention, through which a flag is indexed from one byte in memory to another byte in memory.

Figure 14:
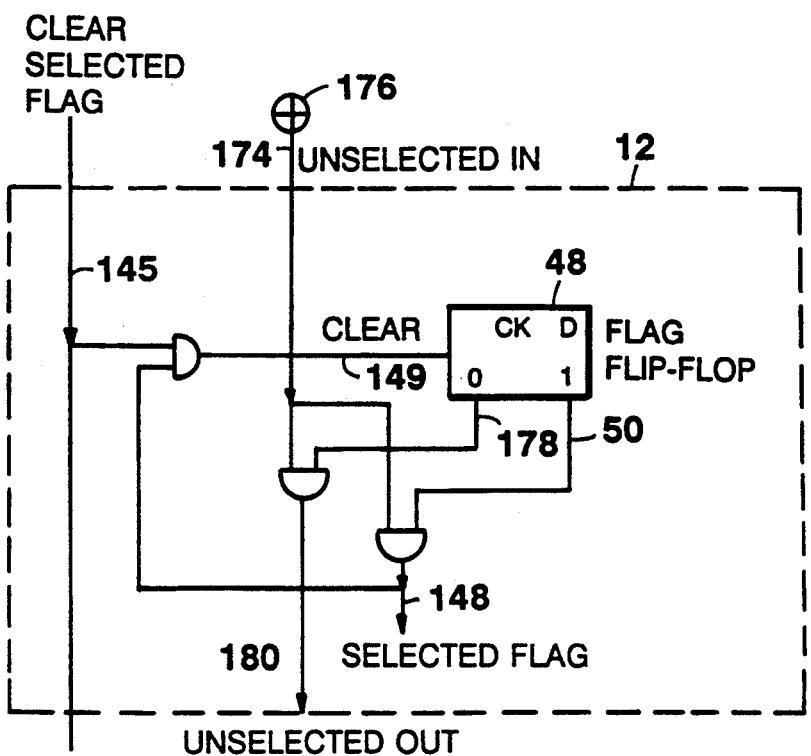

FIG. 14 circuit diagram illustrating a flag selecting circuit according to the invention, through which one of several flags in memory is selected.

Figure 15:
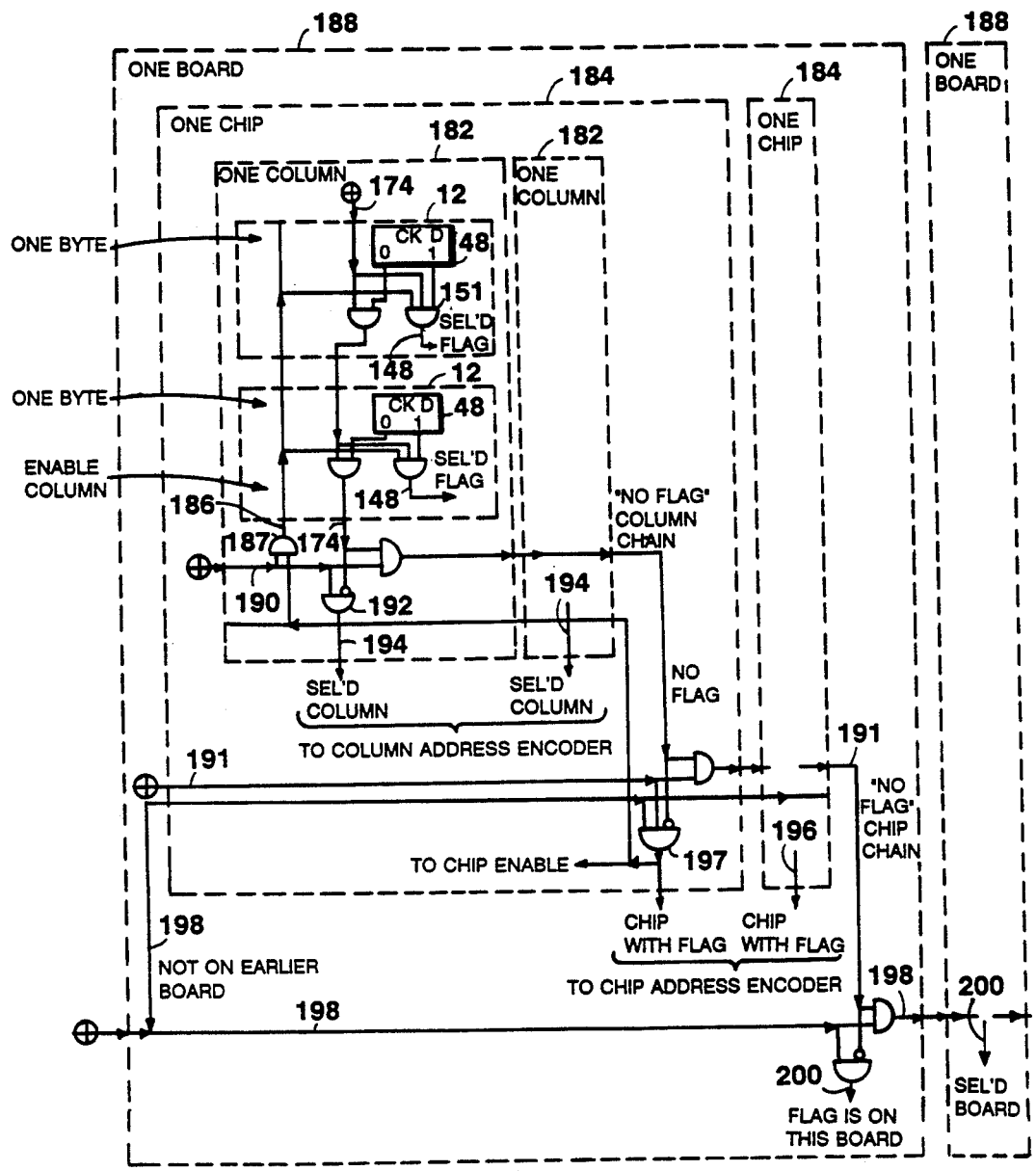

FIG. 15 is a circuit diagram illustrating a flag selecting circuit according to the invention, using a segmented daisy chain design to improve efficiency.

Figure 16:
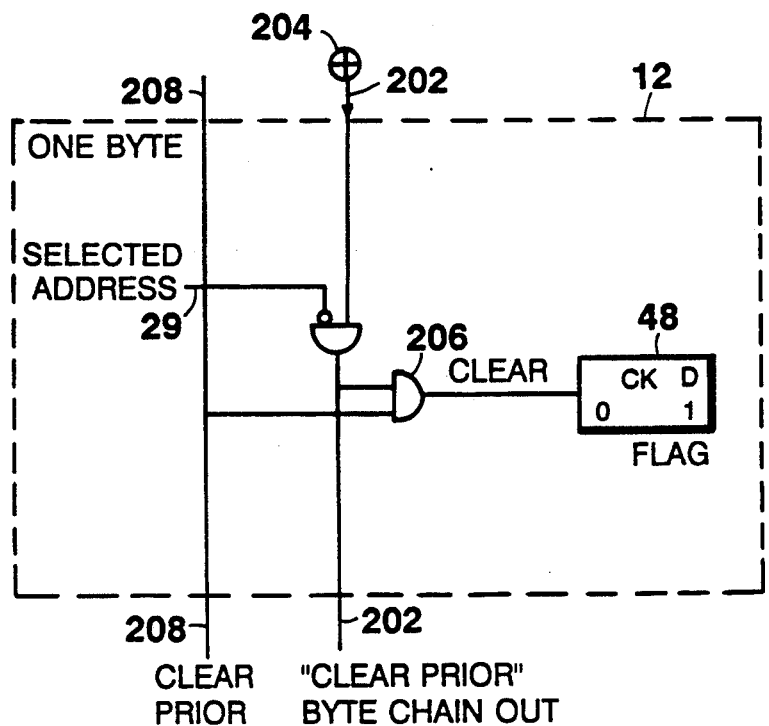

FIG. 16 is a circuit diagram illustrating a circuit according to the invention for clearing prior addresses, through which addressable areas of memory may be selected for processing of flagged strings.

Figure 17:
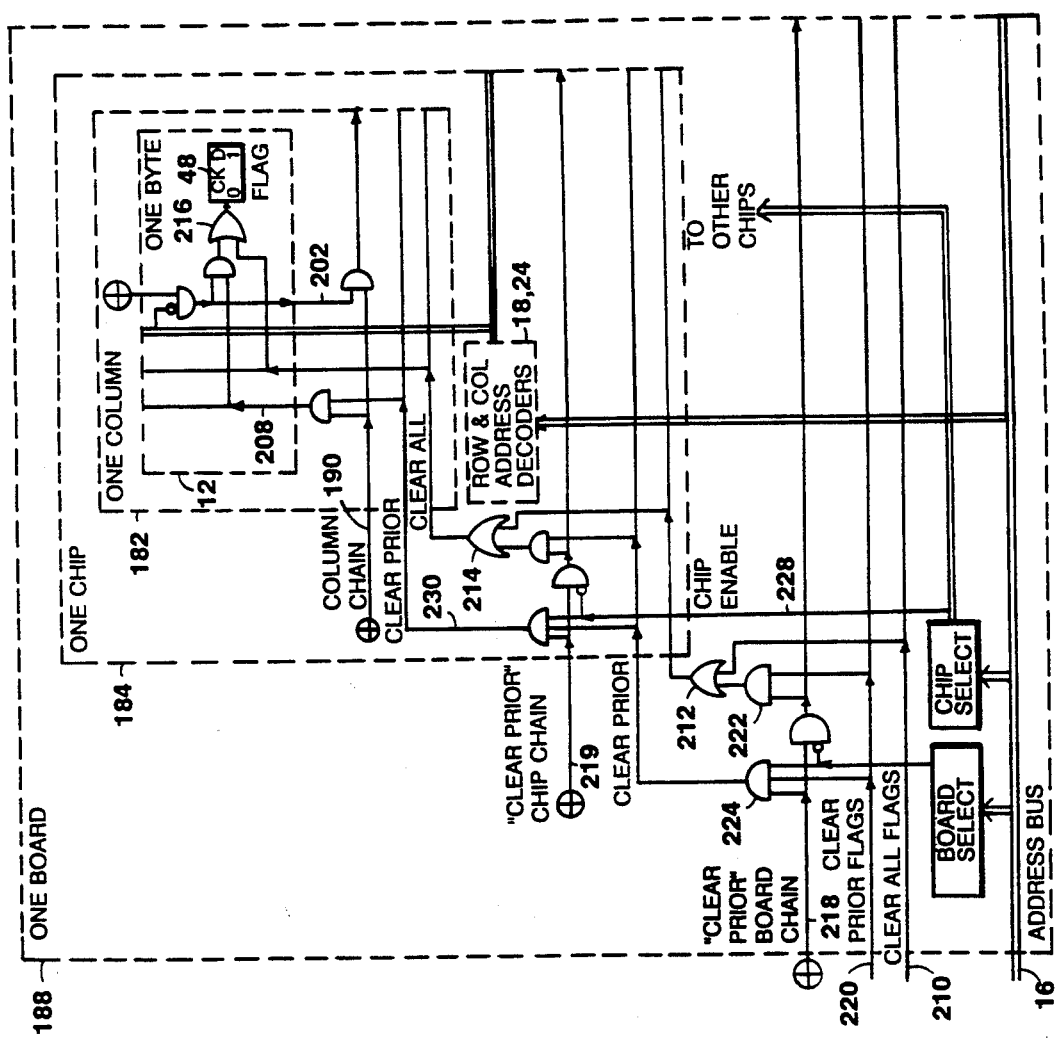

FIG. 17 is a circuit diagram illustrating a circuit according to the invention for clearing prior addresses, using a segmented daisy chain design to improve efficiency.

Structure and Operation

The Variable Access Associative Memory ("VAAM")

The VAAM chip is basically a normal random-access memory in which each 8-bit byte is separately addressed for reading and writing, but in which some extra control circuitry is provided for each separate byte. The extra circuitry provides the additional functions needed for flagging each matching byte, handling strings of bytes, dealing with "variables" (see the section entitled "Variable Within Memory"), performing operations at the flagged byte, such as reading out its address, and dealing with multiple flags. Each of the following sections describes a function of the VAAM chip, shows a logic diagram of the appropriate part of the whole chip, and discusses related alternative circuits.

Memory

Figure 1:
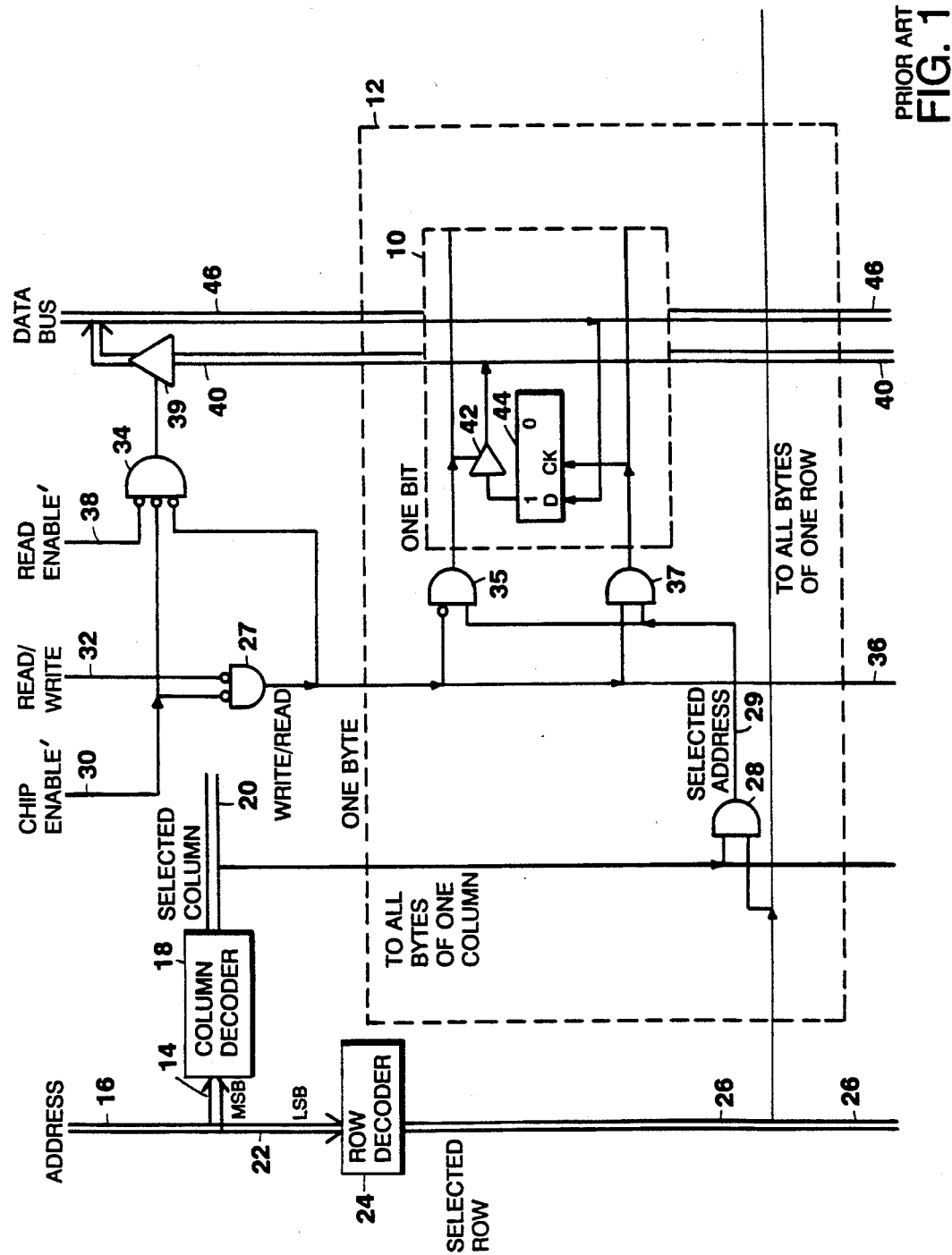
FIG. 1 is a circuit diagram illustrating a known memory circuit.

VAAM can function as a normal memory chip. FIG. 1 diagrams this memory function, which includes the usual circuits for addressing, chip selection, read-enable, bit memory, reading, and writing. Dashed lines indicate that an enclosed circuit is one of a number of identical circuits. Circuit lines passing through a circuit enclosed by dashed lines indicate that the circuit lines pass through a row or column of such identical circuits in parallel. A bus of lines that becomes a single circuit line within a circuit enclosed by dashed lines indicates that each line of the bus goes to a single such circuit. Arrows on lines entering and leaving opposite edges of a dashed enclosure indicate that the line passes serially through the copies of the identical circuits (as in line 52 of FIG. 2).

A single VAAM chip must contain all the bits 10 for each byte 12 that it contains because of the comparison circuitry in each byte. However, parity-check digits may be stored in a separate chip by conventional methods, and are not needed on the VAAM chip.

The bytes in VAAM are arranged in rows and columns. The most significant bits (MSB) 14 of the memory address 16 go to the column decoder 18, where exactly on "column" line 20 is made active. Each "column" line goes to all the bytes 12 in one column. Similarly, the least significant bits (LSB) 22 of the address 16 go to the row decoder 24, which selects one row of bytes 12. In each byte location 12 one of the row lines 26 and one of the column lines 20 are gated 28 so that if both are active then a "selected address" signal 29 indicates that the byte 12 is selected for reading or writing. As described later, VAAM includes flag control circuitry that causes a signal to pass through the bytes in order of the address. Thus, the bits supplied to the address lines must be arranged exactly in order, from most to least significant. Also, the flag control circuitry must be physically arranged to cause the signal ascend through the addresses in each column. Thus, the bottom of one column must be connected to the top of the next one. An alternate arrangement is to have the signal physically ascend in the even columns and physically descend in the odd ones, and arrange for each physical row to be activated by one row address in the even columns (to match the flag sequence that is physically ascending in those columns) and a different row address in the odd columns (to match the flag sequence that is physically descending in them.)

The chip enable' line 30 and the read/write line 32 connect to gate 27, the output of which is connected to gates 35 and 37 in a manner such that a "write" signal 36 can not be supplied to the bytes 12 of the chip unless the chip is enabled (for example, by external circuits that decode other address bits to select this chip). Similarly, gate 34 ensures that a read enable' 38 will not read out the contents of this chip unless the chip is enabled, and only if "read" is also selected. The data from the selected byte 12 is placed on internal data bus 40 via tri-state gates 42 that output a high impedance (that is, "no signal") when the byte is not addressed or when the chip is selected for writing rather than reading, thus allowing some other selected byte to control internal data bus 40 without interference from this byte. The data on internal data bus 40 is placed on external data bus 46 via a set of eight tri-state gates, shown as 39, that output a high impedance when the chip is not enabled, when the chip is selected for writing rather than reading, or when reading is not enabled.

Each bit 10 (of each byte 12) contains a flip-flop 44 as the basic memory element. External circuits assure that the "write" signal 36 will begin only after the address and chip-enable signals have had time to arrive at their correct levels, so the "write" 36 will appear only at the flip-flops 44 of the addressed byte 12. External circuits also assure that the "write" signal 36 will end while the desired bits are present on the data bus 46, thus clocking the desired data into the flip-flops 44.

There will always be one byte 12 selected by the address circuit, and (unless a "write" signal 36 is present) the tri-state gates 42 of that byte 12 will be activated. Thus, the bits 10 of that byte 12 will be placed on the data bus 40 that is internal to the chip. That internal data will then be placed on the external data bus 46 by the read-enable circuit 34 described above via tri-state gate 39.

Associative Memory

Figure 2:
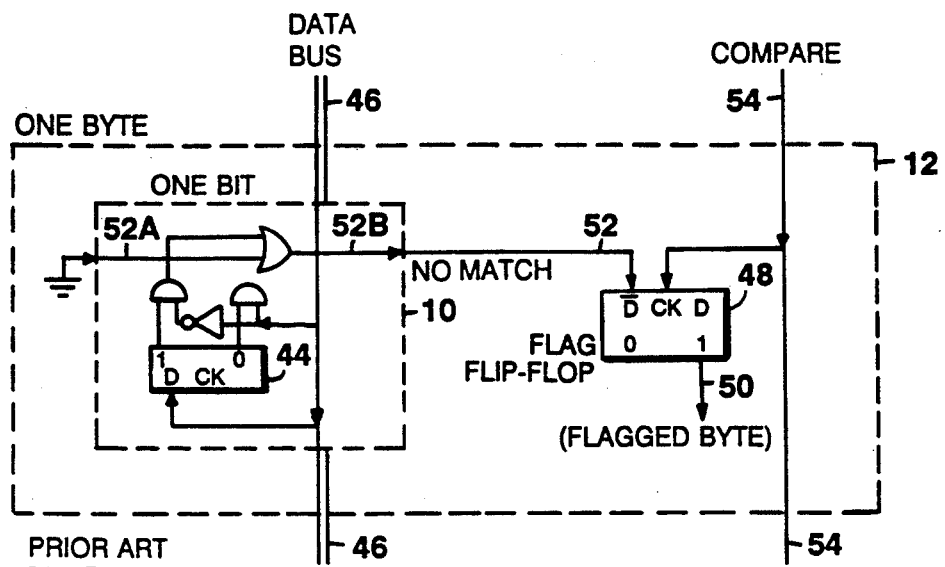
FIG. 2 is a circuit diagram illustrating a known associative memory, through which a byte in memory is compared with an input byte.

VAAM can function as a normal associative memory. FIG. 2 illustrates the associative memory circuit of the VAAM chip, which includes the usual circuits for comparing every byte 12 with the input byte, setting a flag flip-flop 48, and making its output 50 available for enabling an action (such as reading the data or address, as described later).

All bytes can be compared simultaneously with a byte that is presented as an input. Each memory byte 12 whose contents matches the input byte will turn on a flag in its control circuitry. Every flag that is on indicates that its byte matches (or is associated with) the input byte.

As shown in FIG. 2, if any bit 10 in memory is a "0" when the corresponding bit on the data bus 46 is "1" (or vice versa), or if a "no match" signal 52A arrives from the previous bit 10 in the same byte, then a "no match" signal 52B is delivered to the next bit with in the same byte. The "no match" signal 52 in a given byte will be inactive (thus indicating a correct match) only if each bit of that byte matches the corresponding bit on the data bus.

A "compare" signal 54 will clock the "no match" signal 52 of each byte into the byte's flag flip-flop 48. (The flip-flop is essentially a "D" type, in which the end of the clock signal forces the output to be the same as the data present at the corresponding input at that instant.) External circuits will assure that the end of the "compare" signal 54 occurs while the comparison byte is still on the data bus 46.

The output 50 of the flag flip-flop 48 will continue to signify whether this byte matched the most recently "compared" byte.

String-Associative Memory

Figure 3:
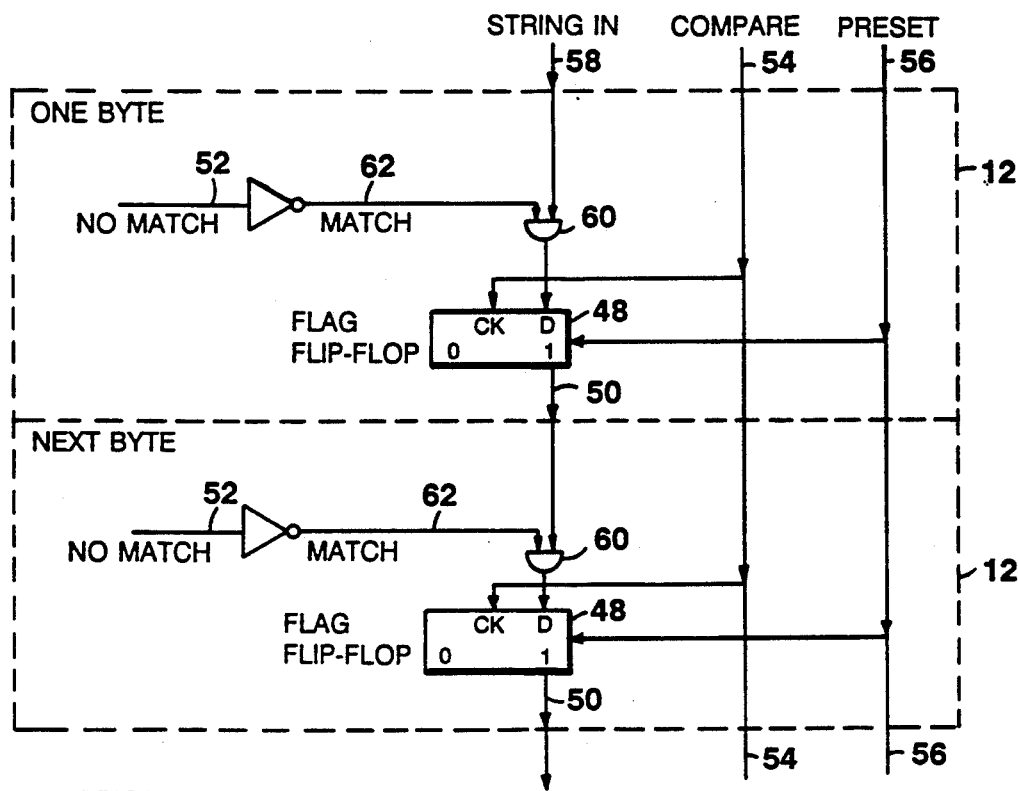
FIG. 3 is a circuit diagram illustrating a known string-associative memory, through which a string of bytes in memory is compared with a string of input bytes.

As shown in FIG. 3, the above "associative" process can then be arranged to operate in a manner described in an earlier patent by Almy et al. titled "Apparatus for In Effect Extending the Width of an Associative Memory by Serial Matching of Portions of the Search Pattern", U.S. Pat. No. 4,575,818, issued Mar. 11, 1986. Two bytes 12 are shown in this figure (and in some later figures) to help visualize the interaction between bytes, even though all bytes are wired identically.

No flag flip-flop 48 can cause a flag 50 to go "on" unless the flag in the preceding byte is "on". Preceding means "next lower addressed", which is shown higher on the diagram. This means that a string of characters presented as an input will cause an "on" flag 50 to advance through memory in every place that has a matching string in memory. At any point at which a memory byte does not match the input byte, its flag will not go "on", and no more flags will advance in this section of memory (whose first few bytes were the only ones that matched). When the input string is finished, every flag 50 that is "on" indicates the end of a string in memory, whose bytes matched the corresponding bytes of the input string. This feature makes VAAM a "string-associative" memory.

Referring to FIG. 3, this process is started when preset signal 56 presets all the flags to "1" and "string in" 58 is activated to the first (topmost) byte 12. In this case, the gate 60 on each "match" line 62 (the inversion of "no match" line 52) will be enabled, and the circuit will operate exactly as in FIG. 2: the flag 50 will go on (that is, remain on) in every byte that matches the first input byte. However, all the other flags will go to "0". On subsequent characters of the input string (with the external circuit no longer activating "string in" 58 to the first byte), a "match" will be recognized only if the preceding flag 50 is "1", signifying that all the characters of the input string have matched up to this point.

Instead of presetting all flags 50 before the first compare signal 54, the circuit could be designed to receive a "first byte" signal and OR it with the preceding flag 50 at each byte, as discussed later in this section. Such a circuit may be a better implementation than the "preset" in some methods of realizing the circuit. However, the "preset" signal simplifies some testing procedures.

Note that the above process advances the flag 50 to the end of each matching string in memory. In many applications this will be adequate because subsequent processing is to be done on the subsequent area of memory. In other applications the subsequent area may contain an address that refers (directly or indirectly) to the start of the string.

However, if it is desirable to let the chip hold a flag at the starting location (or head) of each matching string, the VAAM chip can be designed to do this as described below. It should be noted that this feature is unique to VAAM (it is not found in the earlier patent) but will not be considered in discussing subsequent features of VAAM.

Figure 4:
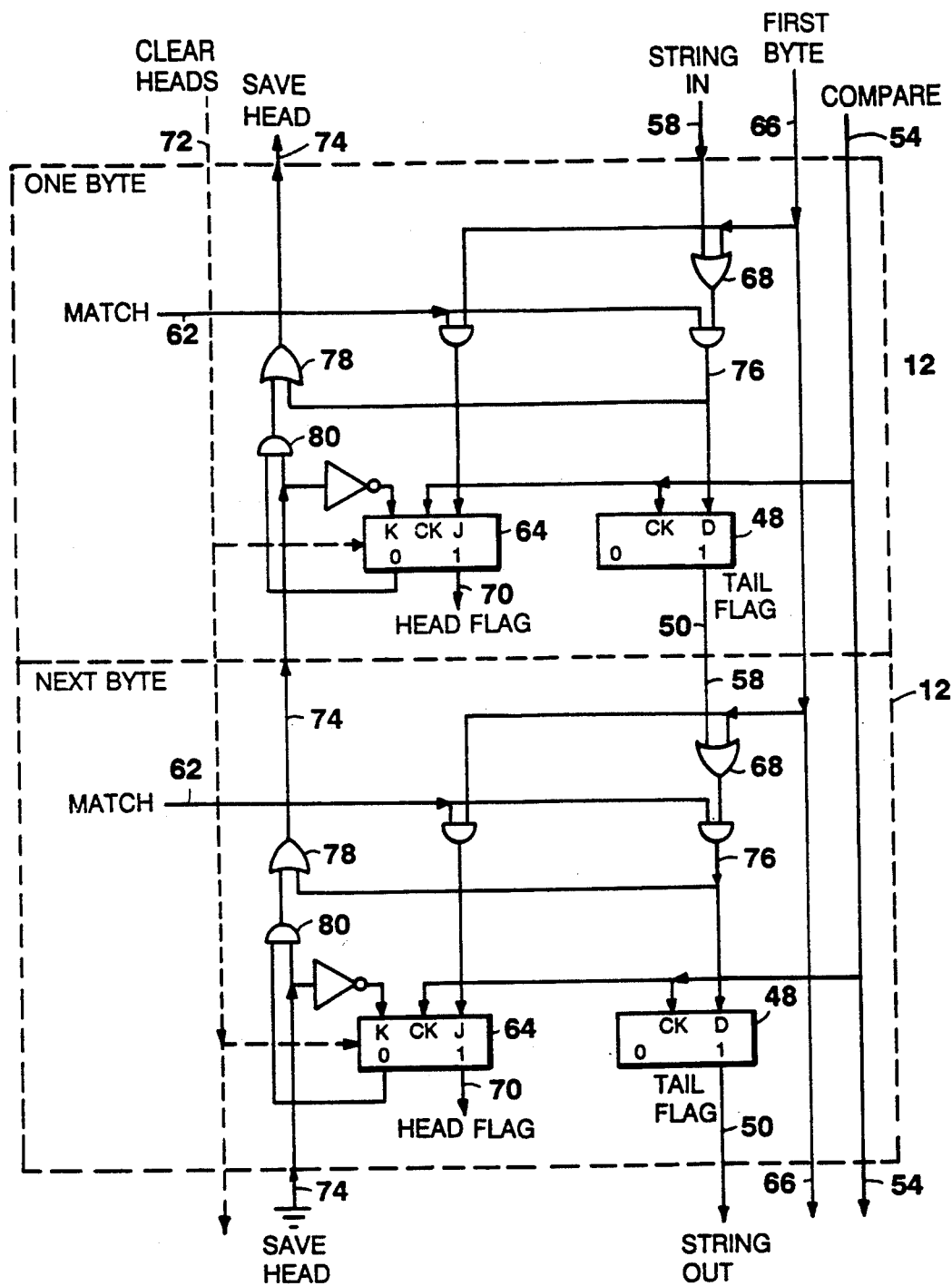
FIG. 4 is a circuit diagram illustrating a string-associative memory according to the invention, in which a flag is held at the starting location or "head" of each matching string in memory, as well as at the ending location, or "tail."

FIG. 4 shows that two flag flip-flop 48, 64 (in each byte 12) are used: They mark the start and end (head and tail) of the matching string. The tail flags 50 operate exactly as the ordinary flags of FIG. 3, but instead of presetting them to generate a "string in" to every location for the first input byte, a "first byte" signal 66 is connected to each "string in" signal 58 through OR circuits 68. This technique is used because the "first byte" signal 66 is available, being needed for the head flags 70 as described below.

The head flags are initially cleared by a clear heads signal 72, but this line can be omitted if the heads can be cleared by some other process. For example, attempting to compare a string of one or more characters that is sure to be absent from memory will surely clear all the heads, as described below.

During the comparison with the first byte, the "first byte" signal 66 is made active. Then, wherever a match signal 62 occurs, the head flag 70 (as well as the tail flag 50) will be turned on, signifying the start (or head) of the string. The head flag flip-flop 64 is essentially a "JK" flip-flop, in which the clock input 54 does nothing if both the J and K inputs are low, changes the state of the flip-flop if both are high, and places the "0" or "1" output in the condition of the "K" or "J" input respectively if the "K" or "J" input respectively is high and the other input is low. During this first byte, the K input does not matter: the flag is a "0", so if a match occurs then even if both K and J are high the flag will be changed from "0" to "1".

The purpose of the "save head" chain 74 is to keep the head flag 70 on so long as all the other characters of the string match, but to turn it off as soon as any character fails to match. If the second (or subsequent) byte of the string matches, the signal 76 that turns on its tail flag 50 is also placed on the save head line 74 through an OR circuit 78. This signal runs back up to the head flag (regardless of how many bytes earlier it is) and prevents the "K" input from allowing the flag to be cleared. All the intervening bytes have their head flags 70 off (except for certain cases in which an erroneous match starts in the middle of some string), so the gate 80 allows the "save head" signal 74 to pass through. But the head flag is on and it disables the gate 80 so the "save head" signal 74 can not pass up to disturb an earlier string in memory. When a character does not match, its byte does not supply a "save head" signal, so the head flag for this string (and all intervening flags, which are already "0") will be set to "0" because the "K" input is active.

Additional circuitry can be added in each byte to make use of the final condition of the head flag, tail flag, or both. For simplicity, the remaining discussions relate only to the "tail flag," or "flag".

Variable Within Memory

A unique feature of VAAM is the special circuitry in each byte that processes a stored byte that is to be considered a variable or "don't care" character.

A variable stored in VAAM is a character that is not to be matched with the same character in the input string. For example, if the stored string is "Print x." then "x" is the variable character. Instead, VAAM will not care what string of characters occurs in the input string at that point. Therefore the variable character is sometimes called a "don't care" or "wildcard" character. However, the character following the stored variable character (the period in this example) must match properly with some later character in the input string.

The input string (for example, "Print Welcome to VAAM.") may contain an arbitrarily long string of characters between the matching character before the variable (the space after the "t") and the matching character after the variable (the period). This string is to be considered a match for the "variable character" and it becomes the "value" of the variable. (In this example, "Welcome to VAAM is the value of the variable "x".)

VAAM will not be concerned with the values of the variables, since it will not have the capacity to store (or point to) the values (in the input string) that match every variable in every matching string in storage. For the input string in the above example, VAAM will flag the following strings as having matched "Print x to VAAM.", "Print y to x.", "x Welcome y VAAM.", etc. In each case, the values of the variables x and y are different.) After VAAM has flagged the matching strings, the software must inspect each flagged string and determine the values of any variables it might contain.

When VAAM encounters a variable character, the intent is to continue advancing the flag from the next byte whenever some later input character matches it, because we don't care how many intervening input characters did not match and can be ignored. Because a flag is advanced whenever a match occurs, more than one flag could be advancing from the variable location at the same time. Each such flag indicates a proper matching string, but with different portions of the input being considered the "don't care" portion. To assure that only one flag is found in each string at the end of the process, the last character to be comparee should be some special character that is known to exist only at the end of strings, so only the one flag (in each string) that is just prior to the end character will advance to the end position.

Figure 5:
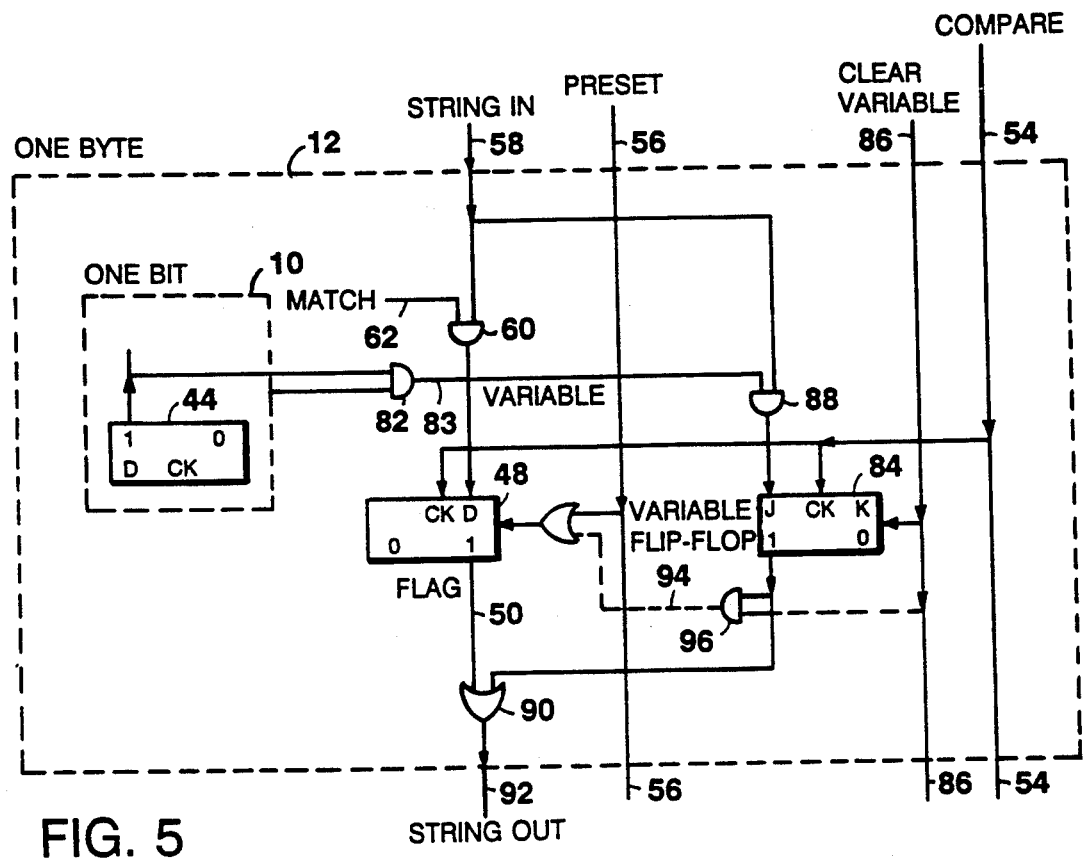
FIG. 5 is a circuit diagram illustrating a variable control circuit according to the invention, through which a variable contained in memory is matched with a of portion of an input string of characters.

FIG. 5 shows the variable-control circuit. The match, string, and flag circuits operate exactly as described in the preceding section.

The values of one or more bits 10 (in each byte 12) are combined in AND circuit 82 whose output 83 indicates whether is to be treated as a variable. A variable flip-flop 84 (in each byte), which is cleared by a "clear variable" signal 86 before starting to compare an input string, will be turned on whenever a string has matched up to this point, as explained below.

If the string has matched up to this point, the "string in" signal 58 enables the match 60 and variable 88 gates. If the next input byte does not match, but this stored byte is labelled as a variable, the variable flip-flop 84 will go on instead of the flag flip-flop 48. Thus, this input byte is treated as a "don't care" byte. Since the outputs of both flip-flops 84 and 48 are combined in an OR 90 to supply "string out" signal 92, the flag (from flip-flop 84 in this case) will advance to the next byte if the succeeding input byte matches it.

However, the variable flip-flop 84 will remain on indefinitely: It is a JK type that responds to a clock input 54 only if its "J" or "K" input is high, so even though the "string in" signal 58 (and therefore "J") is missing during a later comparison, the compare clocking signal 54 will do nothing.

Since the variable flip-flop 84 remains on, it continues to supply a "string out" signal 92 to the next byte. Therefore any later character of the input string that matches the next byte will set the next byte's flag 50 and start advancing it. This will happen no matter how many characters later the match occurs, and no matter how many intervening bytes also matched.

The dashed line 94 is needed if save head circuits (FIG. 4) are used: At the end of an input string, many variable flip-flops 84 may still be on even if they are in strings that have not successfully completed a match. They will continue to save their respective head flags erroneously. So the final step must be to clear the variable flip-flops 84 and provide one more "compare" signal 54 to clear out the heads that are no longer valid. When the variable flip-flops 84 are cleared, any "on" variable is copied to its flag flip-flop 48 by the dashed line 94. The final "compare" signal 54 then advances this flag 50 if the next byte matches an input end character, and the head flip-flop for the string is handled properly. Note that the circuit for the dashed line has a potentially close timing problem because the "clear" on the dashed line 94 will be arriving at the gate 96 just as the variable flip-flop 84 is starting to disable the gate 96. This circuit requires careful implementation in order for it to operate reliably. The simplified control, below, circumvents this problem.

Figure 6:
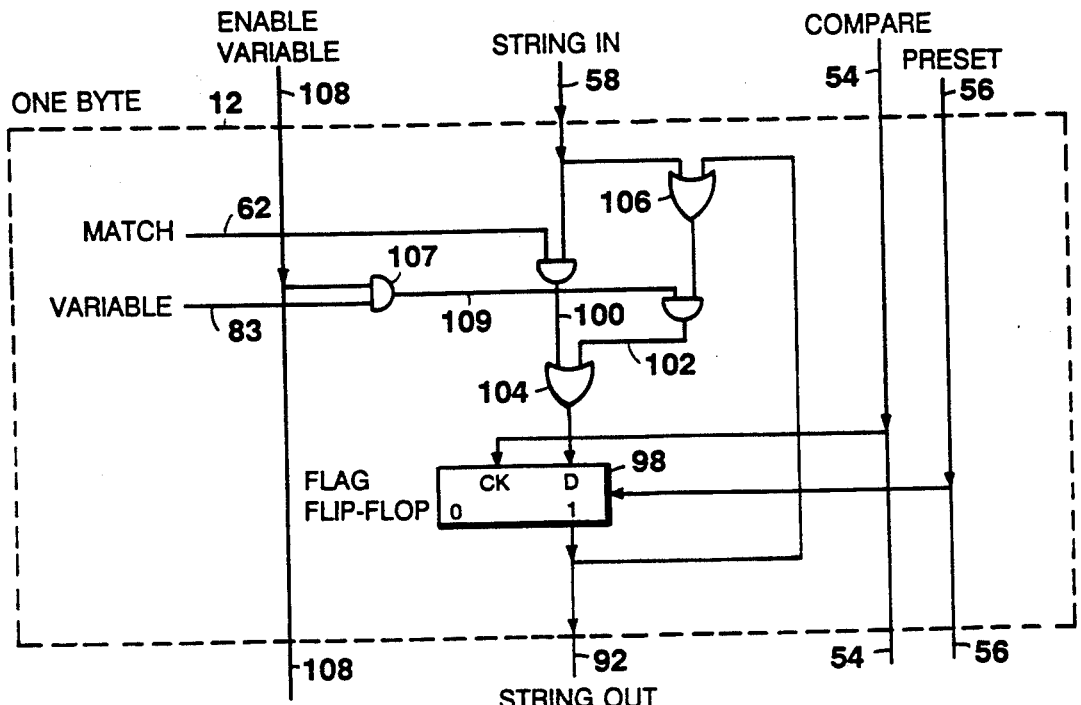
FIG. 6 is a circuit diagram illustrating a simplified variable control circuit according to the invention, through which a variable contained in memory is matched with a portion of an input string of characters.

A simplified method of handling the variable flag is shown in FIG. 6. Both the flip-flops 48 and 84 of FIG. 5 are combined into one flip-flop 98. The "string out" signal 92 simply comes from the one flip-flop 98 (instead of from both, via an OR), and the two gated "string in" signals 100 and 102 go to the one flip-flop 98 via an "or" 104 (instead of to both flip-flops separately). Since the flag flip-flop 98 is not a JK flip-flop, its output is fed back via an OR 106 to keep it on (once it has gone on) if this is a variable byte.

An "enable variable" signal 108 which enables AND gate 107 to produce "enabled variable" signal 109, is needed for two reasons:

(1) When all the flags are turned on for the first byte comparison, the variable circuits must be disabled. Otherwise they will all stay on erroneously because of the feedback circuit described above. If the first stored character of a string is intended to be a variable, it will not be found. Therefore, if the strings to be searched include some that start with a variable, then they (and the input string) should all begin with a standard start character. This is probably a good practice, in any case, to assure that erroneous matches do not start in the middle of some unintended string.

(2) As in the previous circuit, when the input string is finished, many variable flag flip-flops 98 will still be on regardless of whether their strings have completed a proper match. Turning off the "enable variable" signal 108 accomplishes the same purpose as the "clear variable" signal (and dashed line circuit) of FIG. 5: the "permanently on" signal is replaced by the action of a normal flag.

To summarize the action of this circuit: On the first and last compare signal 54, or in each byte that is not a variable, the circuit functions exactly as the standard flag in FIG. 3. Otherwise, (in a byte that is a "variable") when the string matches up to this point (so "string in" signal 58 is on) the flag will go on with the next input byte (treated as a don't care byte) and stay on. Then any subsequent input character that matches the following character in VAAM will initiate a new advancing flag.

Length of Variables

The variable circuitry can be arranged to allow more than one stored character to represent a variable (thus watching for a match more than one character later in memory), and to restrict the number of input characters that can be ignored. These arrangements are described in the following two subsections.

Length of Variable Indicator

A single variable-indicator character, stored as part of a string in VAAM, is sufficient for VAAM to ignore characters of the input string. However, the subsequent software processing may need to differentiate between different variables, such as the x and y in the examples in the previous section entitled "Variable Within Memory." Several ways of doing this are as follows:

(1) Use a different special character to specify each one (like x, y). The VAAM circuit can handle this method by ensuring that the circuit for generating the "variable" signal from the stored bits will cover all such special characters. An easy way to do this is to generate the signal by taking it from only the "1" side of the most significant bit. All normal ASCII (American Standard Code for Information Interchange) characters have a "0" in this position, so no restrictions are placed on normal text that contains no variables. Also, no restrictions are placed on the selection of normal printed characters to be used for different variables if the software that establishes the stored strings in memory converts them to VAAM variable indicators by adding the extra 1. The disadvantage is that each such character can not be used as a normal text character, and so a limited number of characters can be used as variable indicators.

(2) To avoid this problem, a pair of characters can be used. The first one will be a standard variable indicator and the second one will specify which variable it represents (for example #1, #2, #3, etc.) Only one character ("#" in this example) must not be used as a normal text character. The software can convert it to a VAAM variable by adding the extra "1", or VAAM can be designed to recognize all (or most) of the eight bits of the "#" character in gate 82 (of FIG. 5). The second character can be any character (including "#", if the conversion software converts only the first "#" to a VAAM variable), allowing for a wide range of specifiers. An even wider range could be provided by adopting the convention that the "#" must be followed by two specifiers instead of one.

If a pair of characters (the indicator and the specifier) are to be used, there are two ways of dealing with them in the VAAM circuits:

(1) Let the software convert both of them to variable indicators (for example by adding the extra "1"). No change in VAAM is required.

(2) Modify VAAM so that a variable always treats the next byte in storage as the variable specifier, so that the software only has to modify the one ("#") character.

Figure 7:
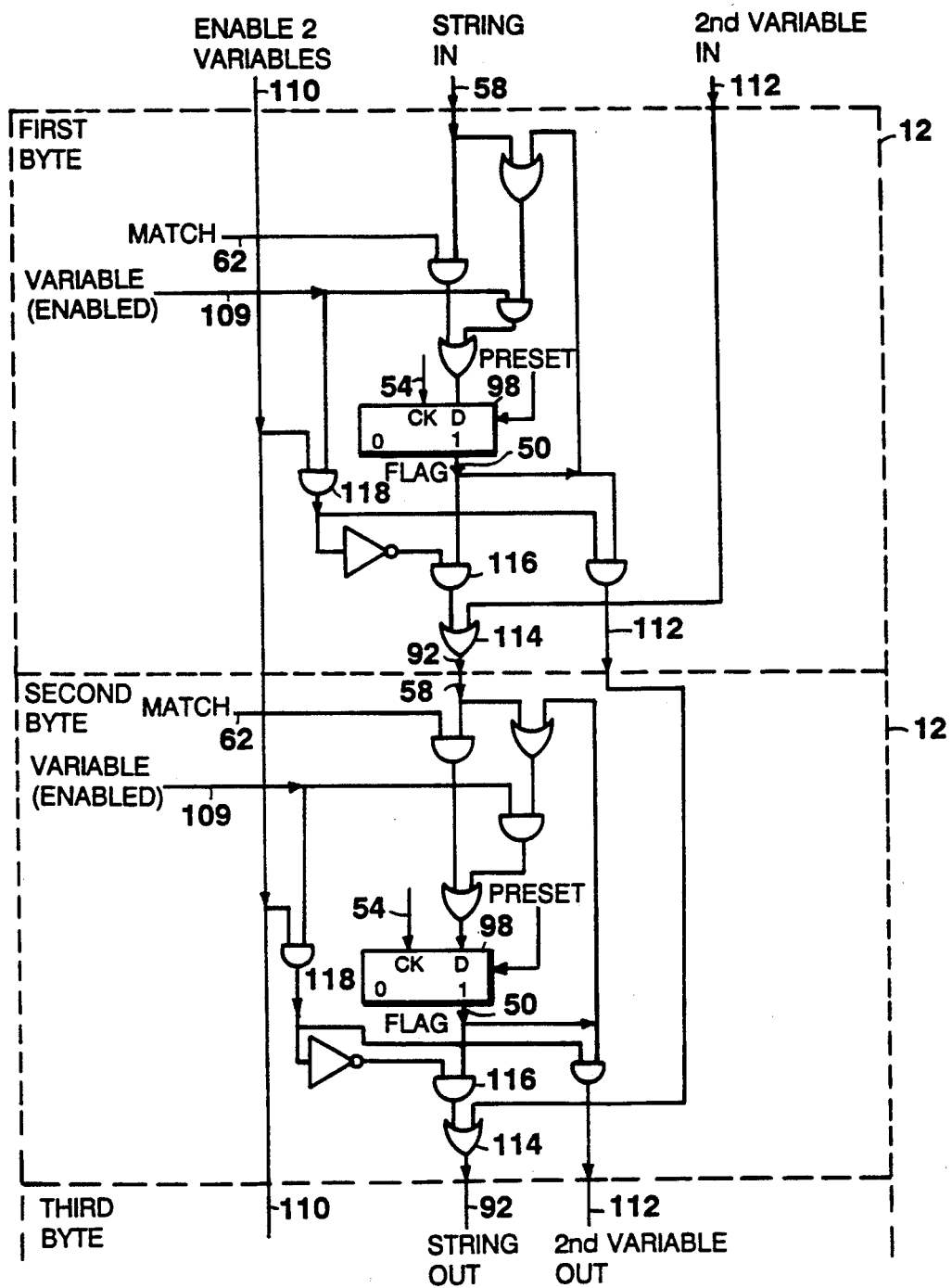
FIG. 7 is a circuit diagram illustrating the circuit of FIG. 6 modified to handle a two-byte variable.

FIG. 7 shows how the simplified variable control of FIG. 6 can be modified to treat the second character as a specifier by ignoring it. As before, two identical bytes 12 are shown in order to make the relationship clear. The variable process can start on any byte, not only on even-numbered bytes. The "enable 2 variables" line 110 enables this feature, and can be controlled from outside the chip (as shown) if all variables in a given search are to be treated the same, or can be rewired to control each byte separately depending on some bit-configuration of the byte. If this control 110 is off, the circuit operates just as before, but if it is on, the circuit operates as follows. The inputs to the flag flip-flop 98, its operation, and its output 50 in a byte that is not a variable are exactly as in FIG. 6. But its output 50 (to string out signal 92) in a byte that is a "variable" is different: The flag's output is not sent to the next byte; instead, it is sent on the "2nd variable out" line 112. This line bypasses the next byte but is mixed with that byte's output in an OR circuit 114 so that it is sent to the succeeding byte via "string out" line 92, thus ignoring the second byte of the variable pair of bytes.

The gate 116 that prevents the output 50 from going to the next byte is needed only in certain applications: if the software sometimes tags the second byte (the variable specifier in the above example) as a variable, then the gate 116 is needed to prevent setting its flag 50 and skipping yet another byte in storage. The "enable 2 variables" line 110 and the gate 118 that it enables in each byte are needed only if VAAM will be used in both of the following applications: where only one character will be used as the variable, (in which case the line must be disabled) and where only one character of a pair will be labelled as a variable (in which case it must be enabled).

Length of Variable Matched

The variable circuitry can be arranged to restrict the number of input characters that can be ignored. For example, it may be desirable to allow a variable to ignore exactly one character, or exactly two, et cetera. In other cases, the number of characters to ignore should be zero or more, one or more, et cetera. Other options might be desired, such as "between two and five bytes must be ignored". The variable indicator byte should specify which option to apply, so any desired combinations of options can be requested in a given stored string of characters. In the simplest VAAM design, only the most general option should be applied, so that all desired entries (along with some that do not meet the requested criteria) will be flagged. Subsequent software processing of variables in the flagged entries will check the options requested by the variable indicators and reject any entries that do not meet the criteria. In this case, several different variable indicator characters will be used by the software, but they will all be stored in VAAM with the same variable indicator bits (such as the most significant "1" in the above examples).

To reduce the number of entries found by VAAM but rejected by the software, VAAM could be designed to handle two or more of the most likely options.

The following paragraphs illustrate circuits to implement some of these options, and the design of additional options should then be obvious extensions of the ones shown.

The figures already shown handle the option of ignoring one or more input bytes: The first byte after the non-variable part of the string will set the variable flag but will not be compared with the succeeding stored byte and so will be ignored. The next input byte (or any following byte) will be compared with the next stored byte.

Figure 8:
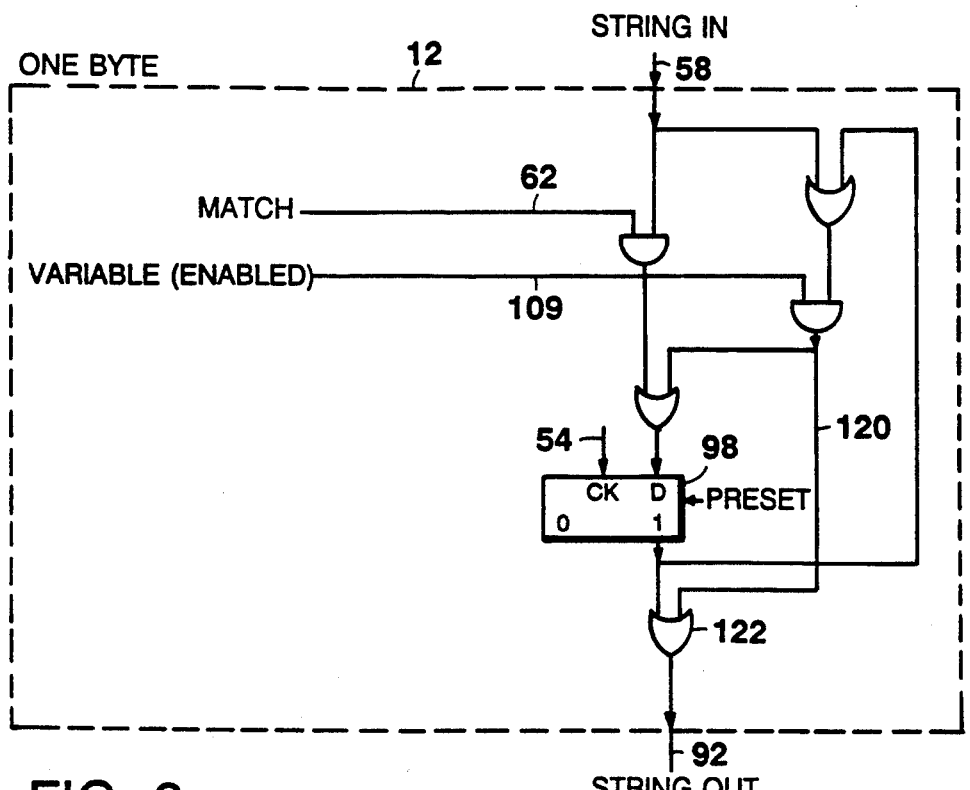
FIG. 8 is a circuit diagram illustrating the circuit of FIG. 6 modified so that the stored string is matched with the input string even if the input string has no bytes corresponding to the variable contained in the associative memory.

The most general option is to ignore zero or more input bytes. FIG. 8 shows how FIG. 6 can be modified to handle this option. One line 120 is added, which forwards the "string in" signal 58 (if this is a variable byte) directly to "string out" signal 92 (via an OR 122). No input bytes are ignored: if the string matches up to this point, the next input byte will be compared with the succeeding stored byte with no intervening "don't care" bytes. Since the remainder of the circuit works exactly as before, any number of "don't care" bytes may occur in the input before a byte matches the succeeding byte.

Figure 9:
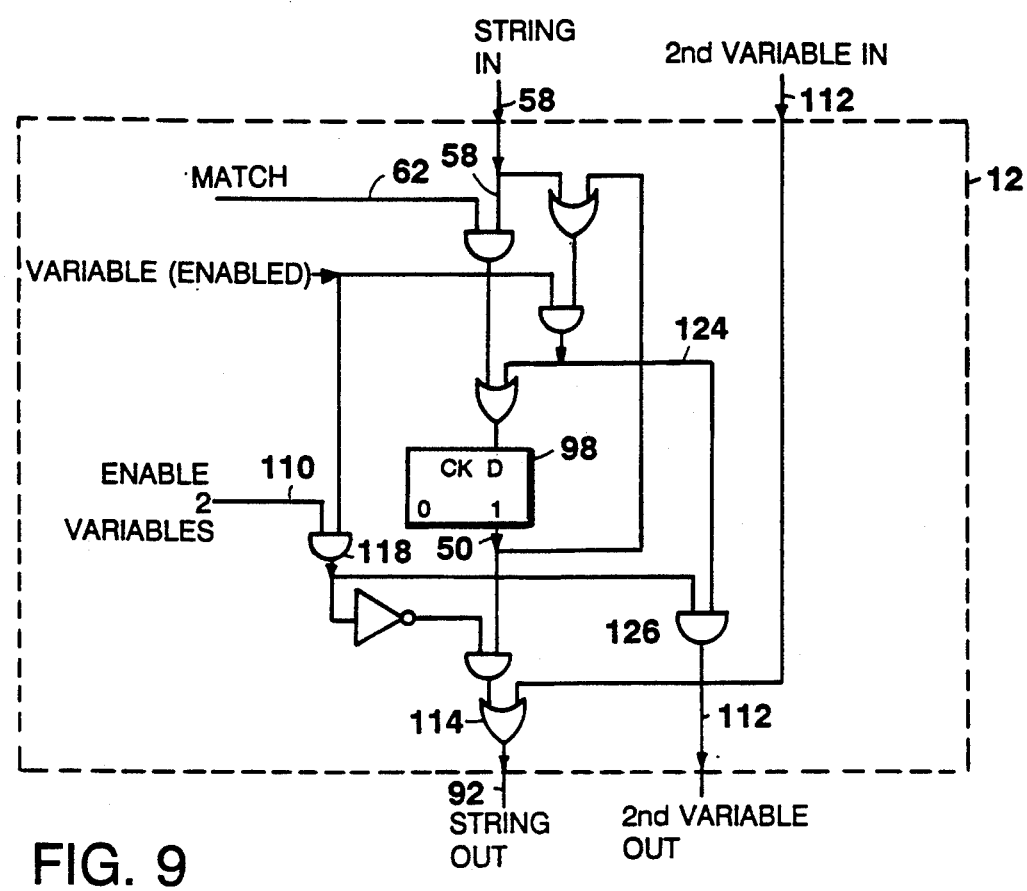
FIG. 9 is a circuit diagram illustrating the circuit of FIG. 7 modified so that the stored string is matched with the input string even if the input string has no bytes corresponding to the variable contained in the associative memory.

FIG. 9 shows how this feature can be added to the circuit of FIG. 7. Note that the new line 124 replaces the line coming directly from the flag flip-flop 98. The flag 50 will still continue to enable the line, if this is a variable byte, via the feedback circuit. The output of the line (via gate 126) does not go to the OR 114 in the same byte, but goes to the "second variable out" line 112 of the same byte, so the second byte of the variable pair will be bypassed. If gate 118 is omitted (because "2 variables" signal 110 is always to be enabled), then gate 126 is redundant and can be omitted.

The option of ignoring exactly one input byte is provided by omitting the feedback circuit in FIG. 6. As before, when an input byte is to be matched with this stored byte it will be ignored because the variable circuit will set the flag. However, the flag will go off when the next input byte is compared, so the flag in the succeeding byte will have only this one chance to advance the string of successful comparisons.

For options that require at least two "don't care" input bytes as a minimum, a counter or shift register must be provided, in each byte, to delay forwarding the variable-flag signal to the "string out" signal until the desired number of ignored bytes have been counted.

Similarly, for an option that requires the ignoring process to stop after two input bytes (for example), a counter or shift register must be provided, in each byte, to delay turning off the feedback circuit that keeps the variable flag on.

If each byte is to control which option to exercise for a variable at that byte, a signal must be generated from the bits of the byte . For example, bit 2 can be used for "exactly", and bit 6 for "at least one. These signals can be used to gate on or off the lines that exercise the various options.

Variable in Input String

Another unique feature of VAAM is the circuitry, in each byte, for processing a variable byte that appears in the input comparison string.

This feature is desirable because in many potential applications of VAAM a table of fixed data (that is, containing no variables) will exist in memory. (For example, one entry might be "City: Boston; Type: Coastal; Location: Northeast.") An input string of bytes will be used to find a piece of fixed data, some of whose parts can be ignored. The input string (rather than the stored string) will have variable or "don't care" bytes for the ignored parts, and some of these variables might be used by the software to identify which parts of the fixed data are to be retrieved for processing (for example: "#1: Boston; Type: #2; #3: #4.")

Another feature could be added to VAAM to allow the input string to present a numerical variable to be used for a magnitude comparison with the stored bytes. This feature is discussed in the subsequent subsection entitled "Numerical Variable Comparison."

Figure 10:
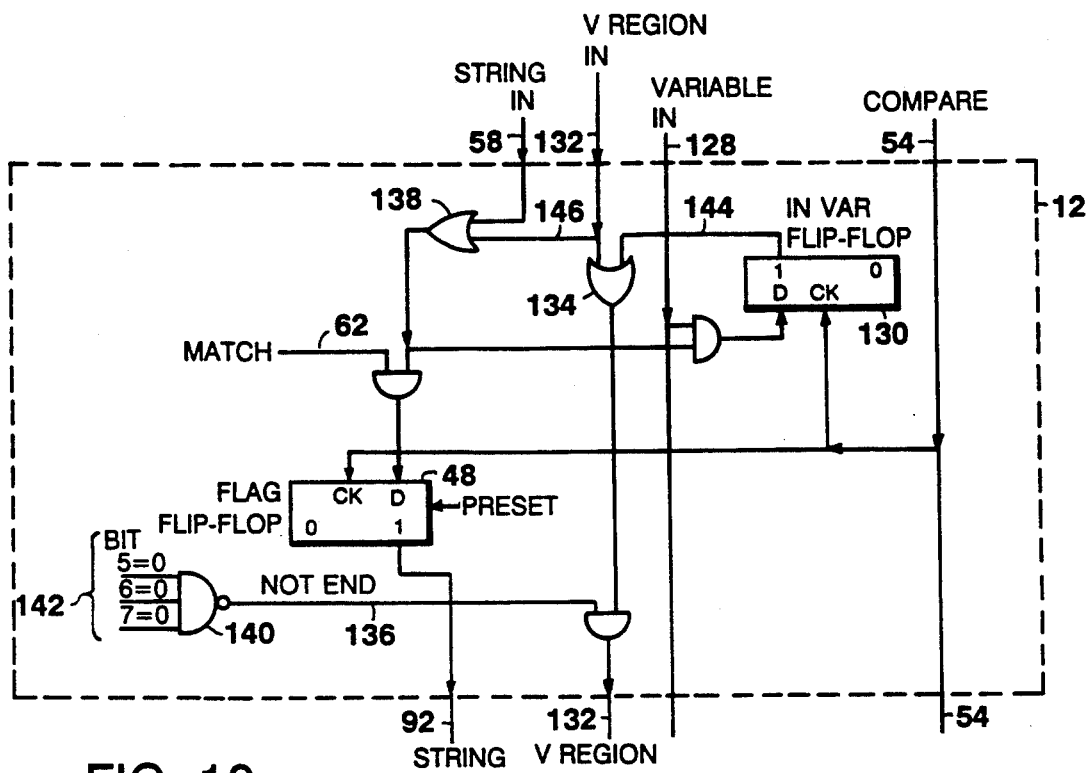
FIG. 10 is a circuit diagram illustrating a variable control circuit according to the invention, through which a portion of a string in memory is matched with a variable contained in an input string of characters.

Returning to the variable byte, FIG. 10 shows how FIG. 3 can be modified to enable a match anywhere later in storage whenever an input variable occurs (thus ignoring the intervening unmatched characters of storage).

Detecting a variable in the input string does not have to be done separately for each stored byte. The detection may be done by a circuit outside the VAAM chips, and its result (the "variable in" signal 128) can be sent to all VAAM chips in parallel. The detector circuit could, instead, be placed inside the VAAM chip so the external circuitry can be simpler, but doing so freezes the selection of the code to use for the variable (unless additional circuitry is placed on the chip to capture the code to be used for subsequent detection.)

A new flip-flop (IN VAR, or "input variable") 130 is added to every byte 12 of VAAM. If the input string has matched the stored bytes up to the point considered in the figure, and the next input character is detected as a "variable in", then it will not "match" and set the flag but will set the IN VAR flip-flop 130 instead. This flip-flop will place a signal on the "variable region" line 132 (via an OR circuit 134). The "variable region" signal 132 will be sent to all following bytes of storage (so long as each byte provides a NOT END signal 136), thus marking the region of storage that is available for consideration as the "don't care" string. Every byte in the variable region will receive a signal on its "string in" line (via an OR 138). Thus, the input byte following the input variable will be compared with every byte in the variable region, and the IN VAR flip-flop 130 will be turned off. Any number of flags might go on in the region, each one marking a potential end of the variable string in storage. As the input string continues, each flag will advance or die. The final comparison should be with a known end character so all flags will be turned off except the one that advances to the end byte (in each table entry).

The NOT END signal 136 is needed to avoid interference from (and confusion with) the subsequent table entry. An end indicator at the end of each table entry (such as the period in the above example) must terminate the variable region for the entry. The end is recognized by a gate 140 (in each byte) controlled by a fixed bit pattern 142 in the byte.

Length of Input Variable Indicator

More than byte can be used to mark an input variable. Once an input variable is recognized, the subsequent input byte can be inhibited from causing a "compare" signal 54 in VAAM. Therefore the byte will be completely ignored by VAAM. The controls for this feature are part of the recognition circuitry, either inside or outside of the VAAM chip.

Length of Input Variable Method

The circuit of FIG. 10 allows one or more stored bytes to be the variable string because the input to the "string in" OR circuit 138 comes from the previous byte's IN VAR flip-flop 130. Since the IN VAR flip-flop output 144 is not fed to the "string in" signal 58 of the same byte, the input byte following the input variable indicator will be compared with the stored byte immediately following the byte whose IN VAR flip-flop 130 is on: It does not matter whether that byte's flag is also "on" because "string out" signal 92 will be replaced in the next byte by the "V REGION" signal 132, and so that byte is ignored.

If two or more (or three or more, etc.) characters are to be required as "don't care", then the "string in" OR 138 must be connected (in each byte) to the second previous (or third previous, etc.) byte's IN VAR. This can be done via a bypass line similar to the "second variable in" line 112 of FIG. 7.

To allow zero don't care bytes (thus allowing zero or more) the input 146 to the "string in" OR circuit 138 must come from the same byte's (not the previous byte's) IN VAR flip-flop 130 (for example, by connecting the "string" OR 138 to the V REGION line 132 after, rather than before, that line's OR circuit 134).

To require exactly one ignored byte, the OR 134 in the "V REGION" line 132 must be omitted (from FIG. 10), and the "IN VAR" flip-flop output 144 must be sent only to the one next byte.

To impose another upper limit to the number of bytes in the region the output 144 of each "IN VAR" flip-flop 130 must be sent only to that number of later bytes in storage. Each byte must OR together the signals from the corresponding number of preceding bytes, and all should be gated by the NOT END signal 136.

If the above options are to be gated and selected by the value of the input variable byte, then a signal line must be run to all bytes in parallel to gate the desired option on or off. The circuits that detect the variable must also decode its value and activate the appropriate signal line or lines.

Numerical Variable Comparison

Figure 10A:
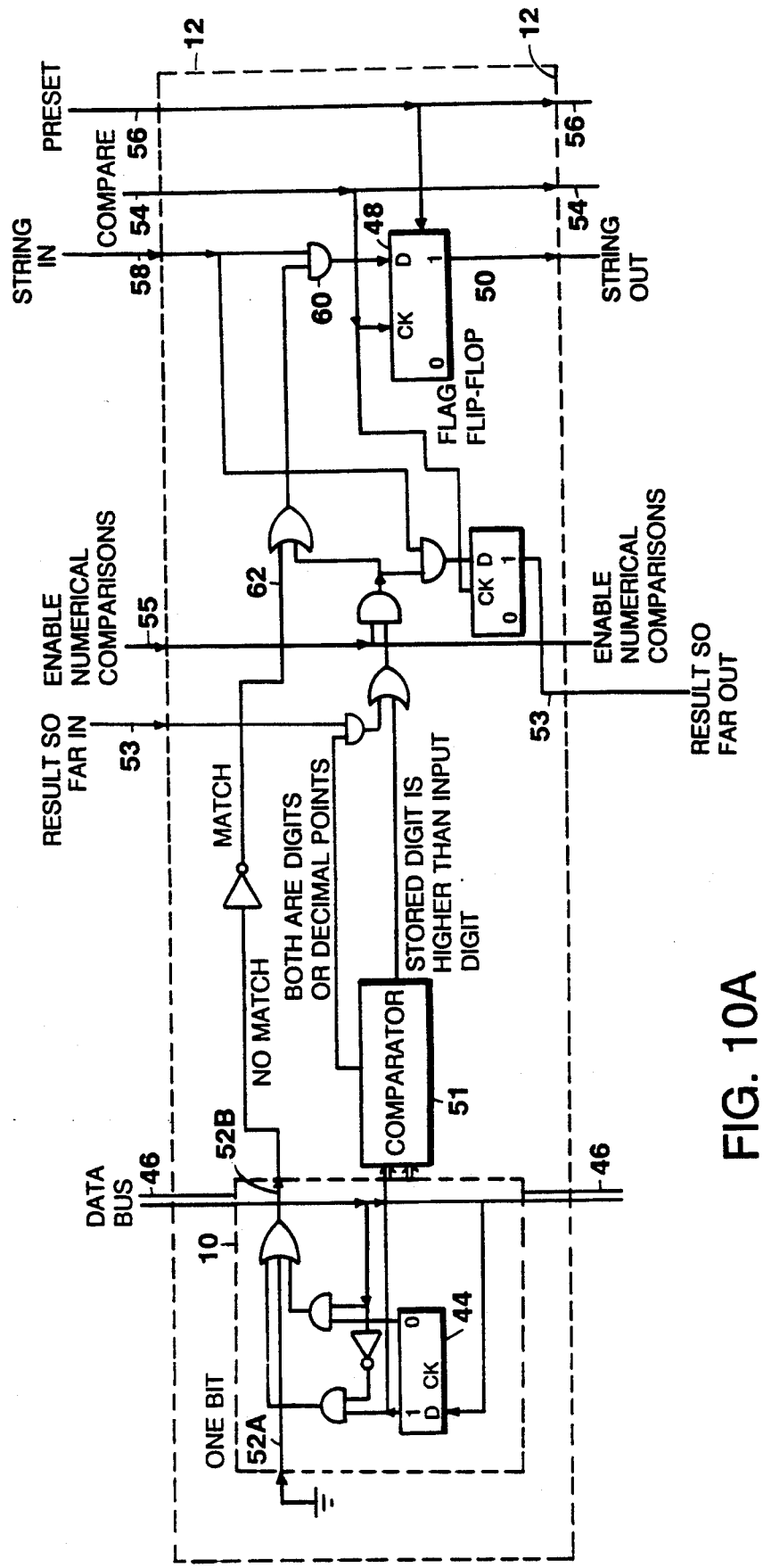
FIG. 10A is a circuit diagram illustrating a numerical variable comparison circuit according to the invention, through which stored numbers are matched with input numbers higher or, alternatively, lower than the stored number.

FIG. 10A shows another feature, a comparator 51, that can be included in each byte for use during the matching process, to permit a string of stored bytes to be compared numerically with a string of input digits. Each stored byte in the string of stored bytes represents a digit, and the string itself represents a number. Likewise, each input byte in the string of input bytes represents a digit, and the string itself represents a number. The comparators 51 can be used to permit all locations in memory holding a number higher (or lower) than the presented number (string of digits) to be flagged (or to allow the flag to be advanced). The comparator 51 is a one-digit subtracter (with appropriate "result so far" lines 53 from the preceding byte and to the next byte) in each byte location. The comparator 51 compares the input byte, considered as an ASCII digit, with the stored byte and forwards the appropriate "result so far" signal 53 to the next byte. Special bits of the input byte could be used to enable a line 55 (running to all bytes of the chip) to enable this feature. If the comparison is successful up to this point, the output of the comparator 51 is used in place of the "match" signal 62 to allow the flag to be advanced.

Processing Flagged Data or Retrieving the Address

The above sections have described how VAAM can set a flag in the byte location at the end (or at the start) of every storage area that matches an input string of characters, while handling various types of "variable" indicators. This section describes what VAAM can do with the flag.

In an associative memory, a match condition is used to cause some activity at the location(s) that were found. VAAM was originally designed for applications in which there will normally be additional software processing based on the matches. Consequently, the simplest activity will consist of reading out the address, or contents, of the flagged locations one at a time. In other applications, such as neural network processing, VAAM could be designed to write data to, or add data into, locations adjacent to the selected flag location or to all the flagged locations simultaneously.

Most flag-processing activities assume there is only one flag selected in the entire VAAM system. The subsequent section entitled "Stepping to the Next Flag" describes how VAAM selects only one flag if more than one is on, how it identifies the VAAM chip containing the selected flag, and how it steps to select the "next" flagged location. For those other activities (such as certain write requests) that are to occur at every flag that is on, an additional control line must be provided to gate each byte's flag flip-flop onto the appropriate activity line in place of the byte's "selected flag" signal.

Any flag that is "on" at the end of the comparison process will be in a byte location that contains the last matching byte, typically an end character. Some activities will require the selected (or every) flag to be indexed to the next byte as described in the subsequent subsection entitled "Index Selected Flag." (Note that "indexing" refers to actually advancing the flag to the next byte, while "stepping," in the subsequent section entitled "Stepping to the Next Flag," refers to deleting the selected flag so that the next "on" flag will become the selected one.)

Read or Write at Selected Flag

FIG. 11 shows how VAAM can read out the contents of (or write into) the byte 12 of the selected flag 148. A "flag data" line 150 is used to disable the normal address selection in all bytes via gate 153. Alternatively, address selection could be disabled at the row or column address decoder. "Flag data" signal 150 also gates the selected flag 148 to the byte read-write circuits 35 and 37 via an OR 152 with the (now disabled) "selected address" signal 154. If a "Chip with Flag" signal 156 indicates that this chip is the "chip with flag" (as explained in the subsequent section entitled "Stepping to the Next Flag") then "flag data" signal 150 also enables the chip by feeding into the chip-enable circuit via an OR 158 to produce "chip enable" signal 166. An external circuit must assure that all external "chip enable" signals 30 are disabled (making them high) so that no other chip will also be trying to read something to or from the data bus. Now any data read or write will take place at the byte selected by the flag rather than the one selected by the address.

A typical use for this feature would be to let the software index the selected flag to the byte following the final match (the end byte), read the contents, index and read the contents of the next byte, and so on until the desired associated data are retrieved. In some applications, the software may need to reexamine the string that was just matched. In these applications, the data originally stored following the end byte could be the address of the start of the matched string.

Write the Sum

FIG. 11A shows an arrangement in which each byte is designed with a one-digit adder 31 (with carry 33 to the next higher-significance digit) for adding the input byte (for example, as an ASCII decimal digit) to the stored byte (at all flagged bytes, or at only the selected flag) and writing the sum.

The adder could be a modified version of the comparator discussed in the previous subsection entitled "Numerical Variable Comparison." Since the comparator requires subtraction, and since subtraction can be accomplished by adding the complements of the digits, the same basic circuit can be used at each byte of the chip if the external circuitry performs the necessary complementing of the input bytes presented for comparison, addition, or subtraction.

The process begins by sending an Input/Output instruction to VAAM for generating a "sum-enable" signal 41 that is fed to all bits of all bytes. Alternatively, this signal could be generated externally from, for example, a special combination of high order bits of each input byte. This "sum-enable" signal 41 enables the sum, rather than the input byte, as the input to the data flip-flops 44 of the byte. The selected flag (or each flag) is indexed to the least significant byte and subsequently indexed in the proper direction, as the input bytes to be added are presented in increasing order of significance in a manner such that the bytes are added to the correct locations.

This feature would be useful in neural network processing, for example, when adding toward a threshold in all elements identified by the previous matching process.

Write to All Flags

VAAM can be designed to allow writing at all the flags that are on by using (or switching to the use of) the "flag" signal 50 in FIG. 11 instead of the "selected flag" signal 148. In this case, the indexing controls (described in the next subsection) would also use the flag signal 50 instead of the selected flag signal 148 so all the flags can be indexed forward or backward to the appropriate position (relative to the end byte originally flagged) simultaneously. Data presented for writing would then be written in all the appropriate locations simultaneously. Multiple characters could be presented for writing, interspersed with the appropriate indexing steps.

Read Address of Selected Flag

Instead of reading the contents of the flagged location, VAAM could be designed to read the address of the flagged location. The software could then use that address as a base for reading or writing wherever desired. One advantage is that VAAM would not require any indexing circuits (although reading out the address does require a very small amount of additional circuitry). One disadvantage is that only one flagged location could be processed at a time.

FIG. 12 shows that the "selected flag" signal 148 enables circuits 160 that encode its row and column address. A "flag address" signal 162 operates like the "flag data" signal 150 of FIG. 11 except that it selects either the data-out lines 40 of the bytes, or the "full address" lines 16 of the encoders 160, via (for example) tri-state gates 164 (whose output is a high impedance when not selected). "Flag address" signal 162 also generates a "chip enable" signal 166 based on "chip with flag" signal 156 (with "chip enable" signal 30 disabled by holding it high), as in FIG. 11.

"Chip with flag" signal 156 also made available externally so that external circuits can generate the remainder of the address bits needed to identify the chip. External circuitry will also be needed to route the appropriate address bits from the chip, from the external "chip with flag" encoder, and from the external "board with flag" encoder to the data bus on appropriate memory cycles.

Normally VAAM will have 8-bit bytes, and so there will be only 8 data-out lines 40. If there are more than 256 bytes on a chip, there will be more than eight address lines 16. The extra lines 168 can be sent out through their own pins and do not need to be gated by "flag address" signal 162. But they must be gated by the same chip-enable (and related) circuitry as the data-out lines 41 so only one chip will output its address on these pins.

Index Selected Flag

In some applications, discussed above, it is necessary to index the selected flag, or all the "on" flags, to the adjacent byte at the next higher or lower address. Such indexing is performed after the comparisons are finished and before the flags are used to control where subsequent action takes place.

FIG. 13 shows the circuit for indexing the flag 50 to the next byte 12 in the forward direction. The flag data line 150 (see the subsection entitled "Read or Write at Selected Flag") is used to enable the indexing, but a separate "index forward" line could be used, particularly if an "index backward" line is also provided. When indexing is enabled, the "selected flag" signal 148 (see the next section) is forwarded as the "string out" signal on a separate line instead of the normal signal (shown as 170), and it is connected to the next flag flip-flop 48 input instead of the normal signal (shown as 172). A "compare" pulse 54 does not actually do a comparison, but forces the selected flag signal 148 to advance to the next byte (clearing the original flag, since its input from the previous "selected flag" signal 148 will be low).

If all flags 50 (not just the selected one) are to be indexed, then the flag flip-flop output 50 must be used directly (not via the "selected flag" circuit). If either option is to be selectable, then gates and a control signal must be provided.

If the indexing is to be in the reverse direction, then the selected flag signal 148 must be fed to the previous byte instead of the next byte. Appropriate changes must be made in routing of the gated signals at the ends of the chip. For example, new "reverse string" in and out lines must be provided. Additional gating is needed if either option is to be selectable.

It should be noted that indexing only the selected flag signal 148 could cause it to index into, and merge with, some later "on" flag. This will normally not occur if software and data are properly designed. In some applications it may be necessary to provide circuitry to prevent this from occurring. For example, an "on" flag could gate "off" an incoming indexing signal and, instead, generate an alarm signal to be processed by the external circuitry.

Stepping to the Next Flag

If only one flag in the whole system remains on after the match process there is no need to "select" one or to step to the next selected one. However, there may easily be more than one "on" flag. This section describes how the first (or last) flag is selected to control further processing, how this selection circuitry can be daisy-chained for fast response, and how the currently selected flag can be cleared so the circuitry will step to the next "on" flag wherever it may be. The software can then process the flagged locations in an orderly manner.

FIG. 14 shows the basic circuitry for selecting the "on" flag 50 at the lowest storage address. The "unselected in" line 174 entering the lowest address byte (at the top of the figure) is set high (plus) 176. If the flag 48 in each byte is not on (its zero side 178 is high), then the "unselected out" signal 180 passed to the next byte 12 will also be high, indicating that all preceding bytes are unselected. As this line passes through all bytes of storage, in address order, it may eventually come to a flag 50 that is on. This will be the lowest address "on" flag. At this byte, the "selected flag" line 148 will go on and the "unselected out" line 180 will go low, indicating to all following bytes that a preceding byte has been selected, and preventing any other byte from enabling its "selected flag" line 148.

If the flag at the highest (rather than lowest) address is to be found, then the circuit must run through the bytes in reverse order. If it is desired to select between lowest and highest, then circuits for both directions can be provided: The resulting "selected flag" lines in each byte can be combined in an OR and the selection of direction can be made by enabling the "unselected in" line at the lowest address or at the highest address.

Note that the "unselected in" line 174 must propagate though all of memory, in a daisy-chain manner. For a large memory, this could take longer than is desired. To improve the response time, the daisy chain can be broken into segments: each column, each chip, and each memory board can indicate whether it contains an "on" flag, so selection of the single selected flag can occur much more rapidly. If either the first or last flag is to be selectable, these segmented circuits must be duplicated, with appropriate modifications, for the other direction.

FIG. 15 shows how this segmented daisy chain works. In each given column 182 of bytes 12 on a given chip 184, the selection line 174 works as in FIG. 14 except that the first "on" flag will be selected only if the "enable column" line 186 is on (which can occur only if a selected flag was not on an earlier board 188, the given chip is the chip with a flag, and no earlier column 182 has turned off the "no flag" column chain 190.) At the bottom of the column, the selection line 174 controls two gates 192, one of which is located in the "no flag" column chain 190. If there are no flags on in this column, the selection line 174 will still be high, the 637 no flag" signal 190 will be forwarded to the next column 182, and the "selected column" signal 194 will be disabled. The "enable column" signal 186 will have been ignored because there are no "on" flags in this column. If there is an "on" flag in this column, then the "selected column" signal 194 will be enabled, and the "no flag" signal 190 will not be passed to the next column. In any column beyond the selected one, the "enable column" signal 186 and "selected column" signal 194 can not go on. A similar process takes place at the end of the columns on a given chip 184. The "chip with flag" signal 196 will be enabled only if one of the columns 182 on the chip has a flag "on", the given chip is the first chip on its board 188 to have a flag "on" (as controlled by "no flag" chip chain 191), and there is no flag on an earlier board. The "chip" with flag" signal 196 will be used inside the chip 184 to turn on the "chip enable" signal and enable the columns (line 186), and externally to encode a chip address. A similar process is used again at the end of the chips on a board 188. If the flag is on any given board, the "selected board" signal 200 goes high, and subsequent boards are disabled because the "not on earlier board" signal 198 is low.

Note that this circuit considerably reduces the number of gates, in series, that must settle before the selected flag is stabilized. Without this circuit, the number of gates that must settle is the same as the number of bytes in VAAM storage. But with this circuit it is only the sum of the number of bytes 12 in one column 182, the number of columns in a chip 184, the number of chips on a board 188, and the number of boards in the system. Time is also needed for an additional three gates, 197, 187, and 151, to carry the signal back down to the byte level. Since all such gates at a given level are driven essentially in parallel, only three gate times are required for this process. Thus, in a one-megabyte memory with 64 bytes column, 16 columns per chip, 32 chips per board, and 32 boards/system, the number of gates through which selection line 174 must pass is 144+3. At one nanosecond per gate, the propagation time is 0.147 microseconds. This is faster than necessary in many systems, since one or more full computer instruction cycles will normally occur between an action that alters the chain signal (such as setting or clearing a flag) and an action that uses the result (such as reading the address of the selected flag).

After the software has finished processing the data for a given flagged byte, it will normally need to clear out that byte's flag so that the next flagged byte, wherever it might be in storage, will become the next selected flag. This is accomplished by running a "clear selected flag" line (145 on FIG. 14) to all bytes, to gate the "selected flag" line 148 onto the "clear" line 149 for that flag flip-flop. The output of the flip-flop must not change until the end of this "clear" signal. Otherwise the selection circuits will start to select the next flag while the "clear" signal is still present, causing the next flag to be cleared also, then the next one, and so on.

Clearing the Unwanted Flags

In a large memory system, a search that is conducted in one area of memory may accidentally also set flags in other areas. There must be some way for the software to ignore flags in areas that are not of interest. If the VAAM chip is merely going to report the addresses of the flagged bytes, then the software could simply inspect the address of the selected byte and if it is out of range step to the next flag and try again. However, this could be a time-consuming process in some applications.

One way to clear out selected areas is to provide a pair of additional flip-flops in each byte. One flip-flop would mark the start of an area of search, and one would mark the end. A "match region" line, similar to the "variable region" line of the previous section entitled "Variable in Input String," would be turned "on" between the marked start and end bytes. This line could be used either to inhibit turning on flags in the unmarked area during a search, or to clear out flags in the unmarked areas after the search and before processing the flags. The marker flip-flops could be set by a "set start" and a "set end" line to all bytes, combining it with either the "selected address" line of each byte or with the flag signal or selected flag signal of each byte. In either case, more than one region could be set for matching at the same time.

If the action at each flag is to read out the address, then a simpler method is to simply clear all flags prior to the address of the start of the area of interest as specified by the software (or following the address, if the flag stepping is done in descending order). As the software processes flags in the remaining area, it can check on whether their addresses have gone beyond the area of interest. If so, the process can stop, or a new "clear prior" address can be given to jump to the next area of interest.

FIG. 16 illustrates this "clear prior" process. The "selected address" signal 29 (of FIG. 1) controls the "clear prior" byte chain 202. The first byte 12 of memory receives a high (plus) signal 204 on the chain input, and this high signal is propagated through all the bytes until it reaches the byte with the "selected address" signal 29. Every byte prior to that one has therefore enabled its "clear" gate 206, so a "clear prior" signal 208 sent to all bytes will only clear the flags in those prior bytes. If "clear following" is desired, then the chain must be connected in the opposite direction.

As with the flag selection circuit described above, this "clear prior" chain can be made considerably faster by breaking it into parts, as shown in FIG. 17. Note that a "clear all flags" signal 210 goes to all boards 188, via an OR 212 to all chips 184 on each board, via an OR 214 to al 182 on each chip, to all bytes 12, and via an OR 216 to clear the flag flip-flop 48 in each byte.

A "clear prior" board chain 218 is high until it reaches the board whose address is selected, and it is low in all subsequent boards. Therefore a "clear prior flags" signal 220 will be gated by gate 222 to clear all chips 184 on boards prior to the selected board, gated by gate 224 produce a "clear prior" signal 226 to the chips of the selected board, and disabled on all subsequent boards. An identical process makes use of a "clear prior" chip chain 219 to clear all chips (of the selected board) prior to the chip whose address is selected (by means of a "chip enable" signal 228), and to send a "clear prior" signal 230 to the columns 182 of the selected chip. In order to clear all columns prior to the selected column, it is sufficient to deliver a "clear prior" pulse 208 to each such column: The selected address is not in those columns and so the signal will be gated on to clear each flag in those columns. The selected column makes use of the "clear prior" circuit of FIG. 16. No signal is sent to the remaining columns because byte chain signal 202 at the bottom of the column is used to disable the column chain signal 190.

Other embodiments are within the following claims.

What is claimed is:

1. An electrical circuit comprising:
   a memory comprising a plurality of storage bytes for storing characters,
   circuitry for receiving an input string of characters presented as an input to the electrical circuit, and for simultaneously comparing a plurality of the characters stored in the storage bytes with a first characters in the input string to find at least one character stored in the storage bytes that matches the first character in the input string,
   string-associative means for finding a location in the memory of at least one stored string of characters that matches the input string of characters by enabling at least one string signal to propagate through the storage bytes, the string signal continuing to propagate as long as consecutive stored characters match consecutive input characters, and
   variable control means for matching a variable indicator contained in one of said input and stored strings of characters with a portion of another of said input and stored strings by enabling the string signal to propagate through at least one storage byte that stores a character differing from a corresponding character in the input string.

2. The electrical circuit of claim 1, further comprising flag setting means for associating a flag with the stored string of characters that matches the input string of characters, the flag being set at the starting location of the stored string of matching characters.

3. The electrical circuit of claim 1, further comprising summation circuitry for adding a number presented as at least one input byte to the electrical circuit to a number stored as at least one byte at the location in the memory of the string of characters that matches the input string of characters.

4. The electrical circuit of claim 1, wherein
said string-associative means is configured for finding the location in the memory of a plurality of stored strings of characters that match the input string of characters,
said electrical circuit further comprises a plurality of flag circuits, each associated with a respective storage byte, for marking with flags the locations in the memory of the plurality of stored strings of characters that match the input string of characters, and
said electrical circuit further comprises selection means for selecting one of the plurality of stored characters marked with flag by enabling a test signal for testing the flag circuits to propagate in a daisy-chain manner through a plurality of first-level chains of gates, each gate in each first-level chain receiving as inputs the propagating test signal and an output from a flag circuit, and by enabling other test signals to propagate in a daisy-chain manner through each of at least one higher-level chain of gates, each gate in each higher-level chain receiving as inputs the propagating test signal and a single output of a lower-level chain of gates that indicates whether a flag is present in any of the flag circuits in the lower-level chain.

5. The electrical circuit of claim 1, further comprising
a plurality of flag circuits, each associated with a respective storage byte, for marking with flags the locations in the memory of the plurality of stored strings of characters that match the input string of characters,
selection means for selecting one of a plurality of flags, the selection means producing a selected flag signal at a location in the memory of the selected flag,
and flag clearing means for receiving a clear selected flag signal, and for gating the clear selected flag signal with the selected flag signal at the location in the memory of the selected flag, to produce a signal for clearing the selected flag, in order to permit another flag to be selected by the selection means.

6. The electrical circuit of claim 1, further comprising:
flagging means for flagging the location in the memory of the stored matching string of characters, and
address readout means for producing as an output an address of the flag marking the stored matching string of characters in the memory, the address readout means comprising a row address encoder for receiving a signal from each row of bytes indicating whether the flag is present in the row and for encoding the signals into a row address and a column address encoder for receiving a signal from each column of bytes indicating whether the flag is present in the column and for encoding the signals into a column address.

7. The electrical circuit of claim 6 wherein the flagging means flags the location in the memory of the stored string of matching characters by setting a flag.

8. The electrical circuit of claim 6 wherein the flagging means flags the location in the memory of the stored string of matching characters by selecting one of a plurality of existing flags marking the locations of a respective plurality of stored strings of matching characters.

9. The electrical circuit of claim 1, further comprising:
flag setting means for associating a flag with the stored string of characters that matches the input string of characters, and
indexing means for moving the flag a predetermined increment in the memory.

10. The electrical circuit of claim 9, wherein the flag setting means associates a plurality of flags with a corresponding plurality of stored strings of characters that match the input string of characters, and
the indexing means moves a selected one of the plurality of flags a predetermined increment in the memory.

11. The electrical circuit of claim 9, wherein the flag setting means associates a plurality of flags with a corresponding plurality of stored strings of characters that match the input string of characters, and
the indexing means moves all of the plurality of flags a predetermined increment in the memory.

12. The electrical circuit of claim 9 wherein the indexing means moves the flag to an adjacent byte in the memory.

13. The electrical circuit of claim 1, wherein said variable control means is a stored variable control means for matching a variable indicator contained in the stored string of characters that matches the input string of characters with a portion of the input string regardless of the contents of the portion.

14. The electrical circuit of claim 13, wherein the variable indicator comprises more than one character of the stored string of characters that matches the input string of characters.

15. The electrical circuit of claim 13, wherein the stored variable control means comprises means for matching more than one variable indicator in the stored string of characters that matches the input string of characters with corresponding portions of the input string regardless of the contents of the portions.

16. The electrical circuit of claim 13, wherein the stored variable control means comprises means for matching the variable indicator with a corresponding portion of the input string regardless of where the variable indicator is located within the stored string of characters that matches the input string of characters.

17. The electrical circuit of claim 13, wherein
the string-associative means comprises a plurality of flag flip-flops, each associate with a respective storage byte, for marking locations in the memory at which a stored character matches a corresponding characters in the input string, and
each flag flip-flop functions also as a variable flip-flop for marking locations in the memory at which a variable indicator matches a portion of the input string.

18. The electrical circuit of claim 13, wherein the stored variable control means matches the variable indicator with the portion of the input string only if the portion is at least one byte long.

19. The electrical circuit of claim 13, wherein the stored variable control means comprises means for ensuring that the stored string of characters is matched with the input string of characters even if the input string of characters has no bytes corresponding to the variable contained in the associative memory.

20. The electrical circuit of claim 13, wherein the stored variable control means matches the variable indicator with the portion of the input string only if the portion contains exactly one byte.

21. The electrical circuit of claim 13, wherein
the variable indicator indicates to the stored variable control means a minimum length of the portion of the input string with which the variable indicator may match, and
the stored variable control means matches the variable indicator with the portion of the input string only if the portion is at least the minimum length.

22. The electrical circuit of claim 13, wherein
the variable indicator indicates to the stored variable control means a maximum length of the portion of the input string with which the variable indicator may match, and
the stored variable control means matches the variable indicator with the portion of the input string only if the portion does not exceed the maximum length.

23. The electrical circuit of claim 1, wherein
said variable control means is an input variable control means for matching a portion of the stored string of characters with a variable indicator contained in the input string regardless of the contents of the portion.

24. The electrical circuit of claim 23, wherein the variable indicator comprises more than one character of the input string.

25. The electrical circuit of claim 23, wherein the input variable control means is capable of matching more than one said portion of the stored string of characters with corresponding said variable indicators in the input string of characters regardless of the contents of the portions.

26. The electrical circuit of claim 23, wherein the input variable control means is capable of matching the portion of the stored string with the corresponding variable indicator regardless of where the variable indicator is located within the input string.

27. The electrical circuit of claim 23, wherein the input variable control means matches the portion of the stored string with the variable indicator only if the portion is at least one byte long.

28. The electrical circuit of claim 23, wherein the input variable control means matches the portion of the stored string with the variable indicator only if the portion contains zero or more bytes.

29. The electrical circuit of claim 23, wherein the input variable control means matches the portion of the stored string with the variable indicator only if the portion contains exactly one byte.

30. The electrical circuit of claim 23, wherein
the variable indicator indicates to the input variable control means a minimum length of the portion of the stored string with which the variable indicator may match, and
the input variable control means matches the portion of the stored string with the variable indicator only if the portion is at least the minimum length.

31. The electrical circuit of claim 23, wherein
the variable indicator indicates to the input variable control means a maximum length of the portion of the stored string with which the variable indicator may match, and
the input variable control means matches the portion of the stored string with the variable indicator only if the portion does not exceed the maximum length.

32. The electrical circuit of claim 23 further comprising stored variable control means for matching a portion of the input string of characters with a variable indicator contained in the stored string regardless of the contents of the portion.

33. The electrical circuit of claim 1, wherein
said variable control means is a numerical variable control means for matching at least a portion of the stored string of characters with a number presented as a string of one or more input bytes if the portion of the stored string of characters represents a number that bears a predetermined mathematical relationship to the number presented as the string of one or more input bytes.

34. The electrical circuit of claim 33 wherein, if a stored character in the stored string is not within the portion of the stored string that the numerical variable control means matches with the number presented as a string of one or more input bytes, the string-associative means matches the stored character with an input character only if the stored character is identical to the input character.

35. The electrical circuit of claim 1, wherein
said string-associative means is configured for finding the location in the memory of a plurality of stored strings of characters that match the input string of characters,
said electrical circuit further comprises selection means for selecting an addressable area of the memory, and
said electrical circuit further comprises flag means for providing flags in the memory only at locations of stored matching strings of characters found within the addressable area.

36. The electrical circuit of claim 35, wherein
the selection means is capable of selecting a plurality of addressable areas of the memory, and
the flag means provides flags only at locations of stored strings of characters found within any of the plurality of addressable areas of memory.

37. The electrical circuit of claim 35, wherein the flag means comprises:
flag setting means for setting flags in the memory at locations of stored matching strings of characters, and
flag clearing means for clearing flags outside of the addressable area of memory selected by the selection means.

38. The electrical circuit of claim 37, wherein
the means for finding the location of a plurality of stored strings of characters that match the input string of characters finds the location of stored matching strings of characters even if the stored matching strings of characters are located outside of the addressable area of memory, and
the flag setting means associates a flag with each stored matching strings of characters found within the memory even if the stored matching string of characters is located outside of the addressable area of memory selected by the selection means.

39. The electrical circuit of claim 37, wherein the flag clearing means clears all flags prior to the addressable area of memory selected by the selection means.

40. The electrical circuit of claim 37, wherein the flag clearing means clears all flags following the addressable area of memory selected by the selection means.

41. The electrical circuit of claim 37, wherein the memory is divided into subareas of memory organized into hierarchical levels, and at each hierarchical level, the flag clearing means clears flags within subareas of memory outside of any subarea within which the addressable area of memory selected by the selection means is located.

42. The electrical circuit of claim 41 wherein, at each hierarchical level, the flag clearing means clears flags only in subareas of memory preceding any subarea within which the addressable area of memory selected by the selection means is located.

43. The electrical circuit of claim 41 wherein, at each hierarchical level, the flag clearing means clears flags only in subareas of memory following any subarea within which the addressable area of memory selected by the selection means is located.

44. An electrical circuit comprising:

a memory comprising a plurality of storage bytes for storing characters, circuitry arranged to receive an input string of characters presented as an input to the electrical circuit, and to simultaneously compare a plurality of the characters stored in the storage bytes with a first character in the input string to find at least one character stored in the storage bytes that matches the first character in the input string, a string-associative circuit arranged to find a location in the memory of at least one stored string of characters that matches the input string of characters by enabling at least one string signal to propagate through the storage bytes, the string signal continuing to propagate as long as consecutive stored characters match consecutive input characters, and a variable control circuit arranged to match a variable indicator contained in one of said input and stored strings of characters with a portion of another of said input and stored strings by enabling the string signal to propagate through at least one storage byte that stores a character differing from a corresponding character in the input string.

* * * * *